(12) United States Patent
Podolskiy et al.

(10) Patent No.: US 7,623,745 B2
(45) Date of Patent: Nov. 24, 2009

(54) PHOTONIC FUNNELS AND ANISOTROPIC WAVEGUIDES FOR SUBDIFFRACTION LIGHT COMPRESSION AND PULSE MANAGEMENT AT THE NANOSCALE

(75) Inventors: Viktor A. Podolskiy, Corvallis, OR (US); Alexander A. Govyadinov, Corvallis, OR (US)

(73) Assignee: The State of Oregon Acting By and through the State Board at Higher Education, Corvallis, OR (US)

( * ) Notice: Subject to any disclaimer, the term of this patent is extended or adjusted under 35 U.S.C. 154(b) by 0 days.

(21) Appl. No.: 11/854,961

(22) Filed: Sep. 13, 2007

(65) Prior Publication Data

US 2008/0219628 A1 Sep. 11, 2008

Related U.S. Application Data

(60) Provisional application No. 60/844,906, filed on Sep. 14, 2006.

(51) Int. Cl.
*G02B 6/26* (2006.01)
(52) U.S. Cl. ......................................... 385/43; 385/123
(58) Field of Classification Search .................. 385/43, 385/126, 122–123, 131, 141–142; 333/239
See application file for complete search history.

(56) References Cited

U.S. PATENT DOCUMENTS

| | | | | |
|---|---|---|---|---|
| 3,569,871 | A * | 3/1971 | Tomiyasu | 333/34 |
| 4,737,014 | A * | 4/1988 | Green | 385/123 |
| 5,572,618 | A * | 11/1996 | DiGiovanni et al. | 385/140 |
| 6,107,901 | A * | 8/2000 | Crouch et al. | 333/239 |
| 6,317,445 | B1 * | 11/2001 | Coleman et al. | 372/45.01 |
| 6,580,862 | B2 * | 6/2003 | Kominato et al. | 385/131 |
| 6,950,598 | B1 * | 9/2005 | Tawa et al. | 385/146 |
| 7,079,727 | B1 * | 7/2006 | Little | 385/28 |
| 7,082,235 | B2 * | 7/2006 | Gunn, III | 385/28 |
| 7,359,593 | B2 * | 4/2008 | Little | 385/30 |
| 7,400,797 | B2 * | 7/2008 | Bhagavatula et al. | 385/32 |
| 7,463,329 | B2 * | 12/2008 | Ballato et al. | 349/169 |
| 2005/0031295 | A1 * | 2/2005 | Engheta et al. | 385/147 |
| 2005/0221128 | A1 * | 10/2005 | Kochergin | 428/824 |

(Continued)

OTHER PUBLICATIONS

Milton, G., "The Theory of Composites", Cambridge Monographs on Applied Computational Mathematics.

(Continued)

*Primary Examiner*—Ellen Kim
(74) *Attorney, Agent, or Firm*—Niels Haun; Dann Dorfman Herrell & Skillman, PC

(57) ABSTRACT

The present invention provides an apparatus for propagating electromagnetic radiation of a selected vacuum wavelength beyond the diffraction limit. The apparatus comprises a waveguide core and a cladding disposed about the core. The waveguide core may include a material with an anisotropic dielectric permittivity, with the optical axis of the material primarily aligned with direction of light propagation. In addition, the waveguide core may have a cross-sectional dimension smaller than about ½ of the selected wavelength at least at one portion of the waveguide core. The cross-sectional dimension of the waveguide core may decrease along the length of the waveguide core creating a taper to provide a photonic funnel. The waveguide core may comprise a homogeneous anisotropic material, anisotropic metamaterial, or a photonic crystal.

23 Claims, 8 Drawing Sheets

U.S. PATENT DOCUMENTS

2006/0039433 A1* 2/2006 Simpson ................ 372/50.1
2006/0062521 A1* 3/2006 Zhou et al. .............. 385/43
2007/0211989 A1* 9/2007 Blauvelt et al. ........... 385/28

OTHER PUBLICATIONS

Troccoli, M., et al., "Raman Injection Laser", Nature, vol. 433, Feb. 24, 2005.
Veselago, V., et al., "The Electrodynamics of Substances with Simultaneously Negative Values of . . . ", vol. 10, No. 4, Jan.-Feb. 1968.
Walba, D., et al., "Near-Atomic Resolution Imaging of Ferroelectric Liquid Crystal Molecules on Graphite by STM", Science, New Series, vol. 267, No. 5201, Feb. 24, 1995, pp. 1144-1147.
Walba, "Fast Ferroelectric Liquid-Crystal Electrooptics", Science, New Series, vol. 270, No. 5234, Oct. 13, 1995,, pp. 250-251.
Xu, Q., et al., "Micrometro-Scale Silicon Electro-Optic Modulator", Nature, vol. 435, May 19, 2005.
Yanik, M., et al., "All-Optical Transistor Action With Bistable Switching in a Photonic Crystal Cross-Waveguide Geometry", Optics Letters, vol. 28, No. 24, Dec. 15, 2003.
Yeh, P., et al., "Electromagnetic Propagation in Periodic Stratified Media. I. General Theory", J. Opt. Soc. Am., vol. 67, No. 4, Apr. 1977.
Larkin, I., et al., "Imperfect Perfect Lens", Nano Letters, Jan. 22, 2005, vol. 5, No. 2, pp. 339-343.
Lawandy, N., "Localized Surface Plasmon Singularities in Amplifying Media", American Institute of Physics, vol. 85, No. 21, Nov. 22, 2004.
Leupacher, W., et al., "Refractive-Index Measurement of Absorbing Condensed Media", Applied Optics, vol. 23, No. 10, May 15, 1984.
Lewis, A., et al., "Near-Field Optics: From Subwavelength Illumination to Nanometric Shadowing", Nature Biotechnology, vol. 21, No. 11, Nov. 2003.
Marques, R., et al., "Left-Handed-Media Simulation and Transmissions of EM Waves in Subwavelength Split-Ring-Resonator-Loaded Metallic Waveguides", Physical Review Letters, vol. 89, No. 18, Oct. 28, 2002.
Mingaleev, S., "Nonlinear Transmission and Light Localization In Photonic-Crystal Waveguides", Optical Society of America, vol. 19, No. 9, Sep. 2002.
Natori, N., et al., "Room-Temperature Gain and Differential Gain Characteristics of Self-Assembled InGaAs/GaAs Quantum Dots for 1.1-1.3 um Semiconductor Lasers", Applied Physics Letters, vol. 77, No. 6, Aug. 7, 2000.
Nezhad, M., et al., "Gain Assisted Propagation of Surface Plasmon Polariton on Planar Metallic Waveguides", Optics Express, vol. 12, No. 17, Aug. 23, 2004.
Shalaev, V., Nonlinear Optics of Random Media, Fractal Composites and Metal-Dielectric Films, Springer Tracts in Modern Physics, 2002.
Park, S., et al., "Surface-Plasmon Dispersion Relations in Chains of Metallic Nanoparticles: An Exact Quasistatic Calculation", The American Physical Society, Mar. 29, 2004.
Pendry, J, "Negative Refraction Makes A Perfect Lens", The American Physical Society, vol. 85, No. 18, Oct. 30, 2000.
Landau., et al., Physical Kinetics, Course of Theoretical Physics, vol. 10, pp. 161-167, 1984.
Podolskiy, V., et al., "Strongly Anisotropic Media: the THz Perxspectives of Left-Handed Materials", Journal of Modern Optics, vol. 52, No. 16, Nov. 10, 2005.
Raether, H., "Surface Plasmons on Smooth and Rough Surfaces and on Gratings", Dec. 1986.
Ramakrishna, S., et al., "Removal of Absorption and Increase in Resolution in a Near-Field Lens Via Optical Gain", The American Physical Society, May 14, 2003.
Stockman, M., "Nanofocusing of Optical Energy in Tapered Plamonic Waveguides", The American Physical Society, vol. 93, No. 13, Sep. 24, 2004.
Scalora, M., et al., "Negative Refraction and Sub-Wavelength Imaging Using Transparent Metal-Dielectric Stacks", Jun. 2006.
Seidel, J., et al., "Stimulated Emission of Surface Plasmons at the Interface Between a Silver Film and an Optically Pumped Dye Solution", The American Physical Society, May 6, 2005.
Shvets, G., "Photonic Approach to Making a Material With a Negative Index of Refraction", Physical Review, 2003.
Student Books, Nature, vol. 272, No. 5648, Mar. 2, 1978.
Maier, S., "Local detection of electromagnetic energy transport below the diffraction limit in metal nanoparticle plasmon waveguides", Nature Materials, vol. 2, Apr. 2003.
Stockman, M., "Nanofocusing of Optical Energy in Tapered Plasmonic Waveguides", The American Physical Society, Sep. 24, 2004, vol. 93, No. 13.
Karalis, A., "Surface-Plasmon-Assisted Guiding of Broadband Slow and Subwavelength Light In Air", The American Physical Society, Aug. 2, 2005.
Belov, P., "Subwavelength Metallic Waveguides Loaded By Uniaxial Resonant Scatterers", The American Physical Journal, Sept. 29, 2005.
Landau, L., et al., "Electrodynamics of Continuous Media", vol. 8, (2000).
Podolskiy, V., et al., "Strongly Anisotropic Waveguide As A Nonmagnetic Left-Handed System", The American Physical Society, May 24, 2005.
Wangberg, R., et al., "Nonmagnetic Nanocomposites for Optical and Infrared Negative-Refratice-Index Media", J. Opt. Soc. Am. B., vol. 23, No. 3, Mar. 2006.
Govyadinov, A., et al., "Metamaterial Photonic Funnels For Subdiffraction Light Compression and Propagation", The American Physical Society, Apr. 12, 2006.
Joannopoulos, J., et al., "Photonic Crystals: Molding the Flow of Light", Princeton University Press, 1995.
Kirk, P., et al., "Image Resolution of Surface-Plasmon-Mediated Near-Field Focusing With Planar Metal Films in Three Dimensions Using Finite-Linewidth Dipole Sources", The American Physical Society, 2004.
Lepeshkin, N., et al., "Enhanced Nonlinear Optical Response of One-Dimensional Metal-Dielectric Photonic Crystals", The American Physical Society, vol. 93, No. 12, Sep. 16, 2004.
Bolda, E., et al., "Optical Pulse Propagation at Negative Group Velocities Due to a Nearby Gain Line", The American Physical Society, vol. 49, No. 4, Apr. 1994.
Gehring, G., et al., "Observation of Backward Pulse Propagation Through a Medium with a Negative Group Velocity", Science 312, 895, 2006.
Jackson, "Multipoles, Electrostatics of Macroscopic Media, Dielectrics" in Classical Electrodynamics, Ch. 4, pp. 145-351 (1999).
Jackson, "Waveguides, Resonant Cavities, and Optical Fibers," in Classical Electrodynamics, Ch. 8, pp. 352-396 (1999).
Alam, M., et al., "Gain Assisted Long Range Surface Plasmon Using Multiple Quantum Wells", Optical Society of America, 2006.
Narimanov, E., et al., "Slow Light in Non-Magnetic Materials with Negative Refractive Index", Optical Society of America, 2006.
Alu, A., et al., Guided Modes in a Waveguide Filled with a Pair of Single-Negative (SNG), Double-Negative (DNG), and/or Double-Positive (DPS) Layers, IEEE Transactions on Microwave Theory and Techniques, vol. 52, No. 1, Jan. 2004.
Baena, J., et al., "Near-Perfect Tunneling Amplification of Evanescent Electromagnetic Waves in a Waveguide Filled by a Metamaterial: Theory and Experiments", The American Physical Society, Aug. 10, 2005.
Bennink, R., et al., "Accessing the Optical Nonlinearity of Metals with Metal-Dielectric Photonic Bandgap Structures", Optical Society of America, vol. 24, No. 20, Oct, 15, 1999.
Bergman, D., et al., "Surface Plasmon Amplification by Stimulated emission of Radiation: Quantum Generation of Coherent Surface Plasmons in Nanosystems", The American Physical Society, vol. 90, No. 2, Jan. 14, 2003.
Betzig, E., et al., "Breaking the Diffraction Barrier: Optical Microscopy of a Nanometric Scale", Science, Vo. 251, No. 5000, Mar. 22, 1991, pp. 1468-1470.
Bigelow, M., et al., "Superluminal and Slow Light Propagation in a Room-Temperature Solid", Science, vol. 301, Jul. 11, 2003.

Bouhelier, A., et al., "Plasmon-Coupled Tip-Enhanced Near-Filed Optical Microscopy", The Royal Microscopical Society, Journal of Microscopy, vol. 210, Pt. 3, Jun. 2003, pp. 220-224.

Bozhevolnyi, S., et al., "Localization and Waveguiding of Surface Plasmon Polaritons in Random Nanostructures", The American Physical Society, vol. 89, No. 18, Oct. 28, 2002.

Adams, An Introduction to Optical Waveguides, Chapter 1, "Two-Dimensional Conducting-Wall Waveguides", 1981.

Adams, An Introduction to Optical Waveguides, Chapter 7 "Circular Waveguides and Step-Index Fibres", 1981.

Chu, S., et al., "Linear Pulse Propagation in an Absorbing Medium", The American Physical Society, vol. 48, No. 11, Mar. 15, 1982.

Demming, F., et al., "Field Distrubution Within Coaxial Scanning Near-Field Optical Microscope Tips", Advanced Functional Materials, vol. 11, Nov. 3, Jun. 2001.

Elser, J., et al., "Nanowire Metamaterials With Extreme Optical Anisotrophy", Physics Optics, Apr. 8, 2006.

Elser, J., et al., "Plasmonic Nanolayer Composites: Coupled Plasmon Polaritions, Effective-Medium Response, and Subdiffraction Light Manipulation", Journal of Nanomaterials, vol. 2007, Article ID 79469, 8 pages.

Fink, Y., et al., "A Dielectric Omnidirectional Reflector", Science, 282, 1679 (1998).

Frey, H., et al., "Enhancing the Resolution of Scanning Near-Field Optical Microscopy by a Metal Tip Grown on an Aperture Probe", American Institute of Physics, vol. 81, No. 26, Dec. 23, 2002.

Gmachl, C., et al., "High Power Directional Emission from Microlasers with Chaotic Resonators", Science, 280, 1556, 1998.

Govyadinov, A., et al., "Sub-Diffraction Light Propagation in Fibers with Anisotropic Dielectric Cores", Physics Optics, May 4, 2006.

Govyadinov, A., et al., "Sub-Diffraction Light Propagation in Fibres with Anisotropic Dielectric Cores", Journal of Modern Optics, vol. 53, Nos. 16-17, 10-20, Nov. 2006, 2315-2324.

Palik, E., Handbook of Optical Constants of Solids, Academic Press Handbook Series, 1997.

Harris, S., et al., "Nonlinear Optical Processes Using Electromagnetically Induced Transparency", The American Physical Society, vol. 64, No. 10, Mar. 5, 1990.

Hrabar, S., et al., "Waveguide Miniaturization Using Uniaxial Negative Permeability Metamaterial", IEEE Transactions on Antennas and Propagation, vol. 53, No. 1, Jan. 2005.

Hu, S., et al., "High-Efficiency and Low-Threshold InGaAs/AlGaAs Quantum-Well Lasers", J. Appl. Phys., 76 (6), Sep. 15, 1994.

Knight, "Photonic Band Gap Guidance in Optical Fibers", Science, 282, 1476 (1998).

Kramer, A., et al., "The Coaxial Tip as a Nano-Antenna for Scanning Near-Filed Microwave Transmission Microscopy", Dec. 1996, pp. 413-417.

Krasavin, A., et al., "High-Contrast Modulation of Light With Light by Control of Surface Plasmon Polariton Wave Coupling", American Institute of Physics, vol. 85, No. 16, Oct. 18, 2004.

* cited by examiner

PHOTONIC FUNNELS AND ANISOTROPIC WAVEGUIDES FOR SUBDIFFRACTION LIGHT COMPRESSION AND PULSE MANAGEMENT AT THE NANOSCALE

RELATED APPLICATIONS

This application claims the benefit of priority of U.S. Provisional Application No. 60/844,906, filed on Sep. 14, 2006, the entire contents of which application(s) are incorporated herein by reference.

FIELD OF THE INVENTION

The present invention relates generally to optical devices and more particularly but not exclusively to techniques and devices for manipulating electromagnetic radiation at subwavelength scales.

BACKGROUND OF THE INVENTION

Compressing the light beyond the diffraction limit is one of the most fundamental problems of modern photonics and plasmonics. Efficient coupling between diffraction-limited and sub-diffraction scales will strongly benefit the areas of near-field sensing, nm-scale optical control, single-molecule spectroscopy, high-energy focusing and compact optoelectronics. While light emission by atoms, molecules, quantum wells, quantum dots and other quantum objects occurs from nm-sized regions, light propagation takes place on μm-wide (wavelength) scales. Such a huge scale difference introduces fundamental limitations on (i) the size of waveguiding structures and (ii) efficiency of coupling between nano- and microdomains. These limitations, in turn, restrict the resolution and sensitivity of near-field microscopes, prevent fabrication of ultra-compact all-optical processing circuits, integrated optoelectronic devices and other photonic systems. However, despite the ever-increasing number of opportunities offered by modern technology, straightforward reduction of size of conventional dielectric waveguides is not possible since the onset of diffraction will lead to either cut-off of waveguide modes or to their leakage into the dielectric surrounding.

A number of approaches to confine the optical signals beyond the diffraction limit has been suggested. These techniques can be separated into two groups. The methods of the first group rely on the excitation of special kind of electromagnetic waves coupled to the collective oscillation of electron plasma, known as surface plasmon polaritons (SPPs). The second group utilizes exponentially decaying (evanescent) fields in tapered waveguides to transmit the information beyond the diffraction limit. However, both these approaches have their limitations. Namely, the dispersion properties of SPPs are substantially different from the dispersion of volume waveguide modes. Therefore, excitation of SPPs requires fabrication of special kinds of coupling structures which can introduce substantial energy loss.

Exponential decay associated with evanescent waves, on the other hand, severely deteriorates the signal-to-noise ratio, limiting the minimum power required to operate the systems and maximum separation between the transmitter and receiver in these structures. Although some approaches involving resonant excitation of surface modes in negative-index or negative-permittivity systems have been promised to restore the evanescent waves, all practical realizations of these structures are so far limited to the near-field proximity of the sub-wavelength source.

Hence, current waveguide technology is unable to effectively confine propagating electromagnetic waves to the regions substantially smaller than half of the optical wavelength (typically, about 300 nm). State of the art plasmonic and plasmon enhanced waveguides are capable of transferring energy to subwavelength scales, but due to the incompatibility of the mode structure with free-space radiation, typically, only 0.5% of initial energy reaches the tip of a fiber in modern near-field couplers.

In Phys. Rev. B 71, 201101 (R) (May 2005), Podolskiy et al. have proposed a nonmagnetic, nonresonant approach to build left-handed media (LHM) using a planar waveguide with anisotropic dielectric core. (Left-handed media, also called negative index media (NIM) or negative phase velocity materials (NPVM), are typically characterized by both negative dielectric permittivity and negative magnetic permeability.) The combination of strong anisotropy of the dielectric constant and planar waveguide geometry yields a negative phase velocity. In ArXiv:physics/0506196 (June 2005), Podolskiy et al. discuss details of the proposed LHM. One material mentioned is a layered stack of alternating dielectric and polar or plasmonic materials. It is generally suggested that a related positive index material made of Ag—Si layers potentially could be used to concentrate propagating modes in subwavelength areas. (ArXiv:physics/0506196. Also US Patent Application 2006/0257090.) There is not, however, any specific discussion or suggestion that the concentration would be in more than one dimension.

Thus, there is a need in the art of optical materials for waveguide technology capable of confining propagating electromagnetic waves to the regions smaller than half of the optical wavelength to permit effective coupling between diffraction-limited and sub-diffraction scales.

SUMMARY OF THE INVENTION

The present invention relates to a waveguide device and method that supports volume propagation modes of electromagnetic waves even when the waveguide radius is significantly smaller than the free-space wavelength. The waveguide can be tapered to provide efficient coupling to and from the nanoscale with 10% or more efficiency. For example, a photonic funnel is a waveguide with cross-sectional dimensions progressively decreasing along the direction of mode propagation, concentrating light energy to the nanoscale. The waveguides of the present invention are characterized by a nonmagnetic, nonresonant core material having a highly anisotropic dielectric constant with either positive or negative refractive index. Such a core material may be realized as a nano-layered metamaterial, e.g., alternating layers of dielectric and metallic layers. The dielectric layers can be gain regions to provide amplification or loss suppression and/or to introduce a versatile control over group velocity of optical pulses in the waveguide. Specific exemplary material systems are provided for five different operational frequencies (near IR: Si/Ag, mid IR: Si/SiC, far IR: doped InGaAs/ AlInAs). The waveguide designs of the present invention may use a mode structure identical to that in conventional optical waveguides, allowing for efficient energy transfer therebetween. As an example, the metamaterial waveguide core can be realized as a 1D photonic crystal (PC) medium, e.g., periodic array of thin dielectric and metallic layers. Both positive and negative refractive index structures are proposed, as well as the combination of different refractive indices to provide phase manipulation.

Prior techniques for subwavelength manipulation of light include anisotropic resonant or magnetic materials and plasmonic waveguides. In one of its aspects, the present invention is distinct from the former in that it uses nonmagnetic, nonresonant core materials, and is distinct from the latter in that it supports volume propagation modes. Although nonmagnetic, nonresonant materials have been studied previously, most of the work concentrated on plane propagation. In addition, though it has been suggested that a positive index material made of Ag—Si layers may be used to concentrate propagating modes in subwavelength areas, such prior work focused on 2D planar waveguides, e.g., a layered system whose layers are vertically stacked, i.e., not stacked in the horizontal direction of propagation in the plane. In contrast, the present invention has layers stacked in the direction of propagation and does not involve propagation in a plane.

In one implementation of the present invention, a layered structure is provided having alternating dielectric and "metallic" layers in the direction of propagation. For near-infrared frequencies 10-15 nm layers of alternating Si and Ag may be used. For mid-IR, 100 nm layers of alternating Si and SiC may be used. For far-IR, 75 nm layers of doped InGaAs followed by 150 nm layers AlInAs may be used. Gain media in the dielectric layers may also be used to provide signal amplification/loss suppression or may be used to modify the group and phase velocities. Fabrication may be currently realized using standard MOCVD techniques and is scalable from THz to IR to optical frequencies.

In one of its aspects, the present invention provides a waveguide for the propagation of light of a given wavelength, wherein: 1) the waveguide core is a nonmagnetic, nonresonant material with an anisotropic dielectric constant formed by either homogeneous material (such as Sapphire or bismuth, for example), or by a metamaterial, for example constructed from material layers oriented perpendicular to the direction of propagation, 2) the cross-sectional dimension of the waveguide is less than the wavelength in at least one portion of the waveguide, and 3) the waveguide supports the propagation of volume modes limited to a single direction along a waveguide axis. More specifically, the present invention also provides such a multi-layer waveguide with a tapered cross-sectional dimension for coupling light to subwavelength regions and/or with gain regions to modulate group velocity of radiation at the nanoscale, i.e., a PC-core waveguide photonic funnel. The tapered waveguide may have arbitrary cross-section. A metallic waveguide cladding may be used to provide better confinement of energy. Variations and extensions to the waveguides of the present invention include modification of the pulse propagation through the system (e.g., to achieve slow or fast light), coupling to free space sources, and shape optimization to further increase the efficiency of the energy transfer.

In one exemplary configuration, the present invention provides a photonic funnel for compressing electromagnetic radiation of a selected wavelength beyond the diffraction limit. The photonic funnel may comprise a waveguide core that includes a plurality of material layers oriented perpendicular to the longitudinal axis of the photonic funnel, and the material layers may be selected to provide an anisotropic dielectric constant along the propagation direction, e.g. a 1-D photonic crystal. The plurality of material layers may comprise alternating layers of a dielectric ($\in >0$) material and a metallic ($\in <0$) material. The plurality of material layers may comprise alternating layers of Si and Ag, alternating layers of Si and SiC, or alternating layers of InGaAs and AlInAs, and may have a thickness along the propagation direction on the order of $1/100$ of the selected wavelength. In addition, the waveguide core may have a cross-sectional dimension that decreases along the length of the device to provide a taper, and the taper may have a minimum cross-sectional dimension less than the selected wavelength of electromagnetic radiation at least at one portion of the taper.

In another exemplary configuration, the present invention provides an apparatus for propagating electromagnetic radiation of a selected vacuum wavelength beyond the diffraction limit. The apparatus comprises a waveguide core and a cladding disposed about the core. As such the cladding may comprise a metal or a dielectric (including air or a vacuum) disposed about the core. The waveguide core may include a material with an anisotropic dielectric permittivity, with the optical axis of the material primarily or substantially aligned with direction of light propagation. In addition, the waveguide core may have a cross-sectional dimension smaller than about ½ of the selected wavelength at least at one portion of the waveguide core.

A waveguide core can also be constructed from nanowire arrays, nanoparticle arrays, or other metamaterials yielding strong anisotropy of dielectric permittivity, such as ones described in Published US Patent Application No. 2006/0257090 to Podolskiy et al., the entire contents of which are incorporated herein by reference. In addition to what is described in US 2006/0257090, sub-diffraction light confinement can be achieved when the optical axis of an anisotropic metamaterial is directed along the propagation direction, similar to that of the nanolayer-based photonic funnel described above.

BRIEF DESCRIPTION OF THE DRAWINGS

The foregoing summary and the following detailed description of the preferred embodiments of the present invention will be best understood when read in conjunction with the appended drawings, in which.

DETAILED DESCRIPTION OF THE INVENTION

Figure 1:
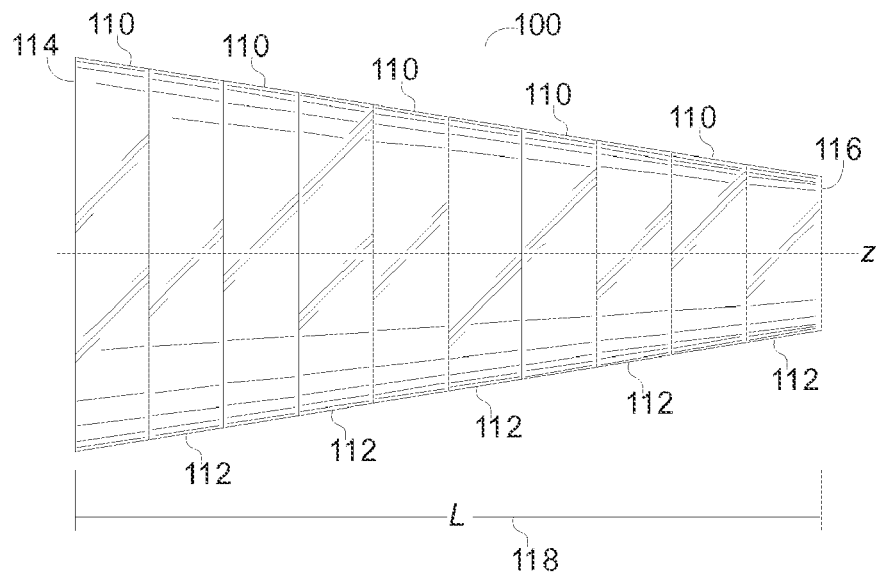
FIG. 1 schematically illustrates side-elevational view of the geometry of a photonic funnel in accordance with the present invention having a phonic crystal waveguide core.

Referring now to the figures, the present invention provides a photonic funnel 100 for compressing light of a selected wavelength, $\lambda$, beyond the diffraction limit, FIG. 1. The photonic funnel 100 is able to compress light beyond the diffraction limit by inclusion of a plurality of material layers 110, 112 of differing dielectric constant oriented along the longitudinal axis of the photonic funnel with each layer having a thickness on the order of $\lambda/100$, e.g., a metamaterial or a 1-D photonic crystal. For example, the plurality of material layers may comprise alternating layers of a dielectric ($\epsilon>0$) material and a metallic ($\epsilon<0$) material. The geometry of a photonic funnel 100 in accordance with the present invention includes a first funnel end 114 and a relatively smaller second opposing funnel end 116 to provide a tapered or optionally conical shape, with the second end having a cross-sectional dimension less than $\lambda$. In order to specify designs under which the light may be compressed to the sub-$\lambda$ scale, analyses of wave propagation in the photonic funnel 100 and PC waveguide materials are set forth below.

Design and Analysis of Metamaterial Photonic Funnels for Sub-Diffraction Light Compression and Propagation In this section, waveguides 200 are presented with photonic crystal (PC) cores 210 that support energy propagation in subwavelength regions with a mode structure identical to that in telecom fibers, and analytical description of light transmission through these systems is developed. Metamaterials are designed for near-, mid-, and far-IR frequencies, and demonstrate ~10...30% energy transfer to and from regions smaller than ½5-th of the wavelength via numerical solution of Maxwell equations. Both positive- and negative-refractive index light transmissions are shown. The approach, although demonstrated here in circular waveguides 200 for some specific frequencies, is easily scalable from optical to IR to THz frequency ranges, and can be realized in a variety of waveguide geometries. The design may be used for ultra high-density energy focusing, nm-resolution sensing, near-field microscopy, and high-speed optical (photonic) computing. Prior to turning to the design and analysis of PC core waveguides of the present invention, wave propagation in isotropic waveguides is developed as a point of reference.

Wave Propagation in Waveguides with Isotropic Cores

The wave propagation in the confined spaces has some universal, design-independent properties. Specifically, the electromagnetic radiation in any waveguide forms a series of system-specific waves: waveguide modes. The wavevector of each mode in the direction of mode propagation $k_z$ is related to the frequency through the following dispersion relation:

$$k_z^2 = \epsilon v \frac{\omega^2}{c^2}, \qquad (1)$$

where $\epsilon$ and $v$ are mode-specific propagation constants. In waveguides with non-magnetic isotropic homogeneous cores $\epsilon$ is the dielectric permittivity of the core, and the parameter $$v = 1 - \frac{\pi^2 m^2 c^2}{\epsilon R^2 \omega^2}$$

relates the frequency $\omega$, the speed of light in the vacuum c, the mode confinement radius R, and a generally non-integer mode number m (|m|>1). The phase velocity of the mode is given by the effective index of refraction. As used herein the effective index of refraction, n, is defined to be: $n=\tilde{k}_z c/\omega=\pm\sqrt{\epsilon v}$.

The mode propagation is possible only when $n^2=\epsilon v>0$. For the waveguide with isotropic homogeneous core, this condition is equivalent to $\epsilon>0$, $v>0$; $n>0$. Thus, there exists a minimal critical radius of a waveguide supporting at least one confined propagating mode, $R_0 \approx \pi c/(\omega\sqrt{\epsilon})=\lambda/(2\sqrt{\epsilon})$. The appearance of such a critical radius is in fact a manifestation of one of the fundamental laws of nature—the diffraction limit. The systems with $R<R_0$, formally described by $\epsilon>0$, ν<0, reflect almost all incoming free-space-like radiation, and are not suitable for energy transfer into subwavelength areas.

The waveguide properties can be controlled by either changing the mode structure (modifying the parameter m), or by varying the waveguide core material (modifying the parameter ∈). The majority of modern subwavelength optical waveguides implement the former technique, and make use of the special type of modes at the metal-dielectric interfaces, known as surface waves, which formally correspond to m²<0. The use of surface waves to adiabatically transfer radiation to nm-regions has been proposed; however, the spatial structure of surface modes is fundamentally different from that of free-space waves and telecom fiber modes. This structural difference requires non-trivial coupling mechanisms to convert the radiation from free-space to surface waves, typically associated with substantial coupling losses.

Sub-Diffraction Light Propagation in Waveguides with Anisotropic Metamaterial Cores The waveguide designs of the present invention for use in the photonic funnel 100 utilize an alternative approach which compresses and propagates the radiation below the free-space diffraction limit. Instead of changing the structure of the modes, the waveguide core is changed. A periodic array of thin alternating layers of a dielectric material (∈>0) of thickness $a_1$ 212 and "metallic" material (∈<0) of thickness $a_2$ 214 [1D photonic crystal (PC)] is used as a metamaterial waveguide core 210, which may be provided in the shape of a cylinder or fiber of radius R, FIG. 2(a). In contrast to previously proposed GHz systems, the design relies neither on resonance nor on magnetism.

In waveguides with perfectly conducting walls where the PC layers 212, 214 are perpendicular to the direction of mode propagation, z, all modes of the system can be separated into two fundamentally different groups. The modes in the first group, known as TE waves, have their electric vector (E) parallel to the plane of the layers 212, 214, and the modes in the second group, TM waves, have their magnetic vector (H) parallel to the plane of the layers 212, 214. Similar to the case of a homogeneous waveguide described above, the frequency and wavevector of a wave in a PC waveguide core can be related through the dispersion relation:

$$\cos(k_z\Delta)=\cos(k_1\alpha_1)\cos(k_2\alpha_2)-\gamma\sin(k_1\alpha_1)\sin(k_2\alpha_2), \quad (2)$$

where $\alpha_1$ and $\alpha_2$ are thicknesses of the layers 212, 214 in the PC, $\in_1>0$, and $\in_2<0$ are their permittivities, $k_1^2=\in_1\omega^2/c^2-\pi^2m^2/R^2$, $k_2^2=\in_2\omega^2/c^2-\pi^2m^2/R^2$, $\Delta=\alpha_2+\alpha_2$, and the parameter γ is equal to $$\gamma_{TE} = \frac{1}{2}\left(\frac{k_1}{k_2}+\frac{k_2}{k_1}\right)$$

and $$\gamma_{TM} = \frac{1}{2}\left(\frac{\varepsilon_2}{\varepsilon_1}\frac{k_1}{k_2}+\frac{\varepsilon_1}{\varepsilon_2}\frac{k_2}{k_1}\right)$$

for TE and TM modes, respectively.

The case when the period of the system is much smaller than the wavelength ($|k_1\alpha_1|\ll1$, $|k_2\alpha_2|\ll1$ and $|k_z(\alpha_1+\alpha_2)|\ll1$) is of a special interest for the design. In this limit Eq. (2) becomes identical to Eq. (1) with polarization-specific propagation parameters ∈ and ν, given by $$\varepsilon = \varepsilon_{PC}^{TM} = \varepsilon_{PC}^{TE} = \frac{a_1\varepsilon_1+a_2\varepsilon_2}{a_1+a_2}, \quad (3)$$

$$v_{PC}^{TM} = 1 - \frac{a_1\varepsilon_2+a_2\varepsilon_1}{\varepsilon_1\varepsilon_2(a_1+a_2)}\frac{\pi^2m^2c^2}{R^2\omega^2},$$

$$v_{PC}^{TE} = 1 - \frac{1}{\varepsilon_{PC}^{TE}}\frac{\pi^2m^2c^2}{R^2\omega^2}.$$

In a way, the PC core 210 plays the role of a homogeneous but anisotropic uniaxial metamaterial with its optical axis parallel to the direction of mode propagation. This effective medium response of PC structure is almost unaffected by material periodicity and therefore is highly tolerable to fabrication defects.

The propagation of TE modes in the PC waveguide 200 is completely analogous to the propagation in isotropic systems described earlier. In contrast to this behavior, the PC waveguide 200 can support TM waves in two fundamentally different regimes. The first regime, described by $\in_{PC}^{TM}>0$, $v_{PC}^{TM}>0$ corresponds to $n=\sqrt{\in v}>0$, while the second one, $\in_{PC}^{TM}<0, v_{PC}^{TM}<0$ describes a $n=-\sqrt{\in v}<0$ case unachievable in conventional fiber- and plasmonic-waveguides.

Figure 2:
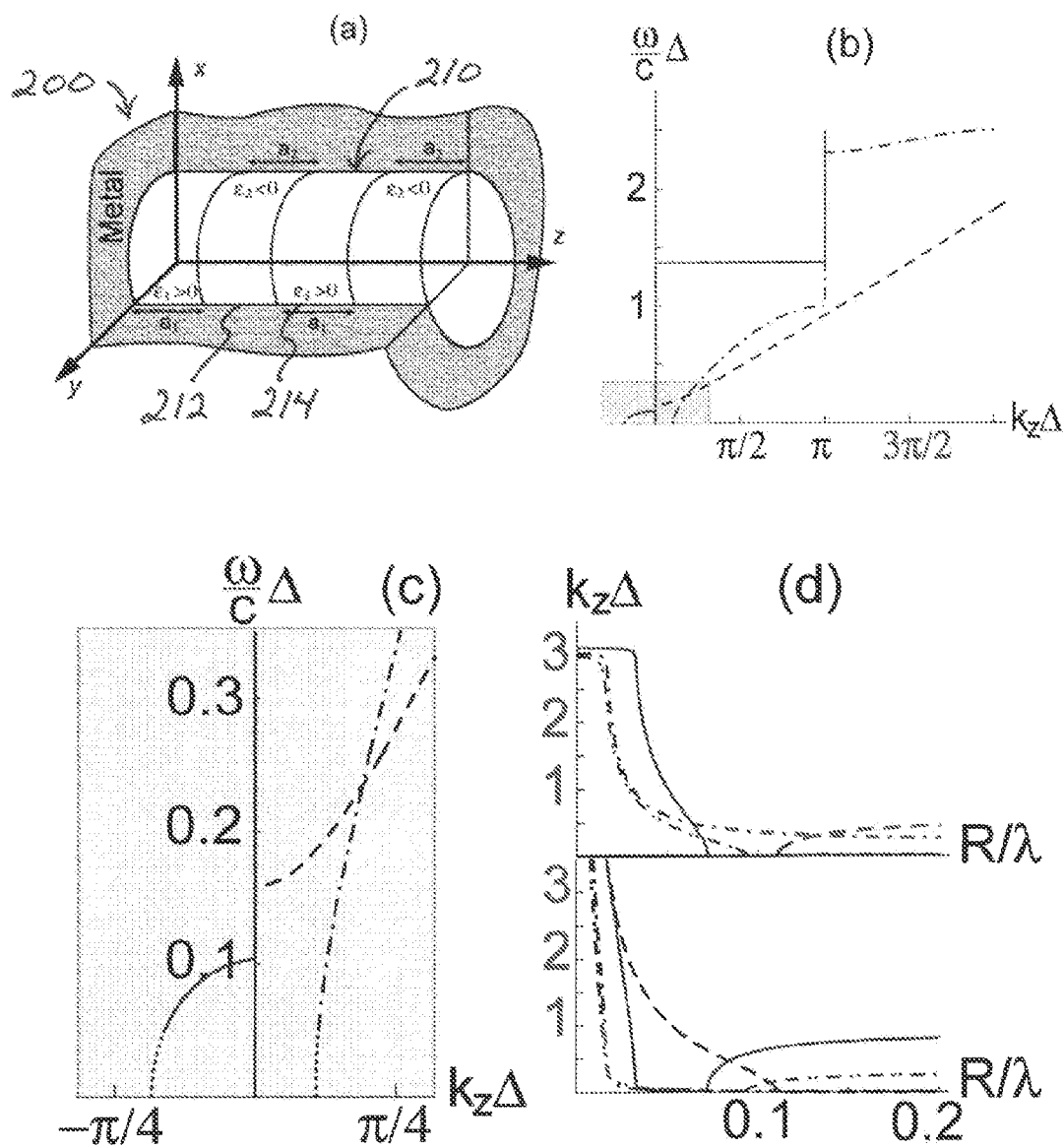
FIG. 2(a) schematically illustrates a photonic crystal waveguide in accordance with the present invention having thin alternating layers of dielectric ($\in >0$) and "metallic" ($\in <0$) materials.
FIG. 2(b) illustrates unfolded dispersion diagrams of the $TM_{01}$ mode in three different waveguides, one comprising a Si core (dashed line), one comprising the n>0 mode in a Si—SiC photonic crystal (PC) core (dash-dot line), and one comprising the n<0 mode in a Ag—Si core (solid line)
FIG. 2(c) illustrates an enlarged view of the shaded portion of the graph of FIG. 2(b)
FIG. 2(d) illustrates confined mode propagation in photonic crystal waveguides with absolute values of real (upper graph) and imaginary (lower graph) parts of the wavevector shown for the $TM_{01}$ mode in the Si-core (dashed), and Ag—Si (solid), Si—SiC (dash-dotted), and InGaAs—AlInAs (dash-dot-dotted) PC structures.

Both n>0 and n<0 waveguide structures may support wave propagation in highly-confined areas, FIG. 2. Indeed, the refractive index in substantially thin (R≪λ) strongly anisotropic systems ∝1/R. The decrease in R is accompanied by a decrease of internal wavelength λ/λnλ, virtually eliminating the diffraction limit for TM waves in structures of the present invention. Furthermore, PC waveguides 200 of the present invention with different refractive indices can be combined together, opening the door for the effective phase manipulation of light propagating in highly-confined areas. The possibility of such a versatile light management on nanoscale is a principal feature of the present invention.

To illustrate the design of the present invention and its scalability, light propagation is calculated through PC waveguides 200 with (i) 100-nm-thick layers ($a_1=a_2=100$ nm) of SiC and Si with an operating wavelength of λ=11 μm, (ii) 15-nm-thick layers ($a_1=a_2=15$ nm) of Ag and Si with an operating wavelength of λ=1.2 μm, and (iii) layers of 75 nm-thick ($a_1=75$ nm) InGaAs doped with electrons to $10^{19}$ cm$^{-3}$ followed alternately by 150 nm ($a_2=150$ nm) AlInAs barriers, with an operating wavelength of λ=20 μm. The first of these structures has n>0, while the latter two systems correspond to n<0. These structures may be fabricated using any acceptable technique. For example, one may use MOCVD, e-beam writing, or MBE techniques to build a nanolayer composite with the total height equal to the length of the anisotropic waveguide, followed by ion-beam or chemical etching to "shape" the cylindrical or conical waveguide. E-beam writing or self-assembling techniques could be also used to directly fabricate a fiber with nanolayer core 210. (See Maier et al., Nature 2, 229 (2003); Kik et al., Phys. Rev. B, 69, 045418 (2004); Karalis et al., Phys. Rev. Lett. 95, 063901 (2005); Bozhevolnyi et al., ibid., 89, 186801 (2002); Gmachl et al., Science 280, 1556 (1998); Troccoli et al., Nature 433, 845 (2005); Lepeshkin et al., Phys. Rev. Lett. 93, 123902 (2004); Bennink et al., Opt. Lett. 24, 1416 (1999), the entire contents of which references are incorporated herein by reference.).

In FIGS. 2(b)-2(d) mode propagation is illustrated in the cylindrical PC waveguide 200 of the present invention in comparison to a homogeneous Si waveguide core. Specifically, FIGS. 2(b) and 2(c) show the unfolded dispersion diagrams of the $TM_{01}$ mode in three different waveguides: one comprising a homogeneous Si core (dashed line), one comprising the n>0 mode in a Si—SiC photonic crystal (PC) core (dash-dot line), and one comprising the n<0 mode in a Ag—Si core (solid line). In each case the material dispersion and absorption are neglected, and both PC cores 210 have layers of equal thickness, $a_1=a_2$. FIG. 2(d) illustrates confined mode propagation in PC waveguides with absolute values of real (upper graph) and imaginary (lower graph) parts of the wavevector shown for the $TM_{01}$ mode in the Si-core (dashed), and Ag—Si (solid), Si—SiC (dash-dotted), and InGaAs—AlInAs (dash-dot-dotted) PC structures.

The appearance of the cut-off radius in the isotropic Si core (dashed line), along with energy propagation in subwavelength metamaterial-waveguides is clearly seen. For the Si core the frequency cut-off is present at R~λ/n corresponding to diffraction limit; this behavior is similar to that of TE modes in PC structures. The low-frequency regime (dotted region in FIG. 2(c)) is not realizable in nature since $\in(\omega \to 0)$ has to be positive. It is interesting to note the difference between the cut-off properties of modes in n>0 and n<0 PCs. The n>0 systems are only affected by material inhomogeneity (see below), while the n<0 modes require ν<0 and therefore propagate only in sufficiently thin waveguides.

Mode Compression in Photonic Funnels

The self-adjustment of PC waveguide modes to the waveguide size, accompanied by compatibility between the mode structure in PC waveguides, telecom fibers, and free-space, makes the PC systems ideal candidates for effective energy transfer between macroscopic wave-propagation systems and nano-scale objects. In these coupling structures with a photonic funnel 100, the size of the PC waveguide of the funnel 100 gradually varies along the direction of mode propagation, squeezing the light into nm-sized areas much like a conventional funnel squeezes water into a thin bottleneck, which is another significant feature of the present invention.

The efficiency of energy compression in photonic funnels can be related to adiabaticity parameter $$\delta = \left| \frac{d(1/k_z)}{dz} \right|,$$

that defines the reflection by the funnel structure and absorption in the system. Increase of the funnel's length 118 typically reduces reflection loss, but increases absorption.

Figure 3:
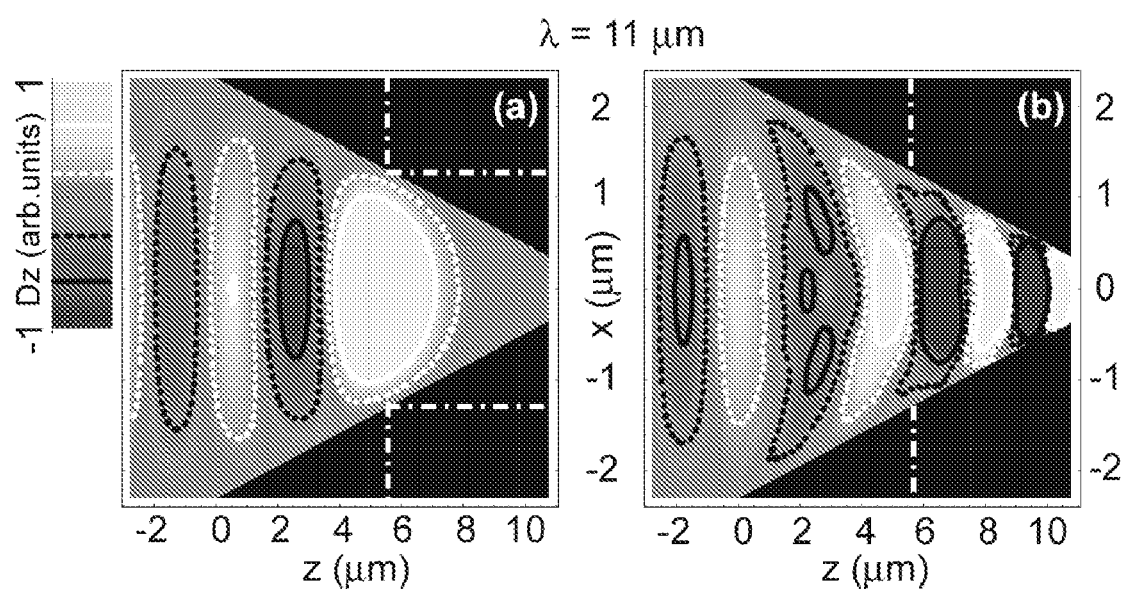
FIG. 3 illustrates a comparison between the light propagation in a homogenous core photonic funnel with a PC-based photonic funnel in accordance with the present invention, with FIG. 3(a) showing a homogeneous Si core structure and FIG. 3(b) showing the field concentration in a Si—SiC PC photonic funnel in accordance with the present invention.
Figure 4:
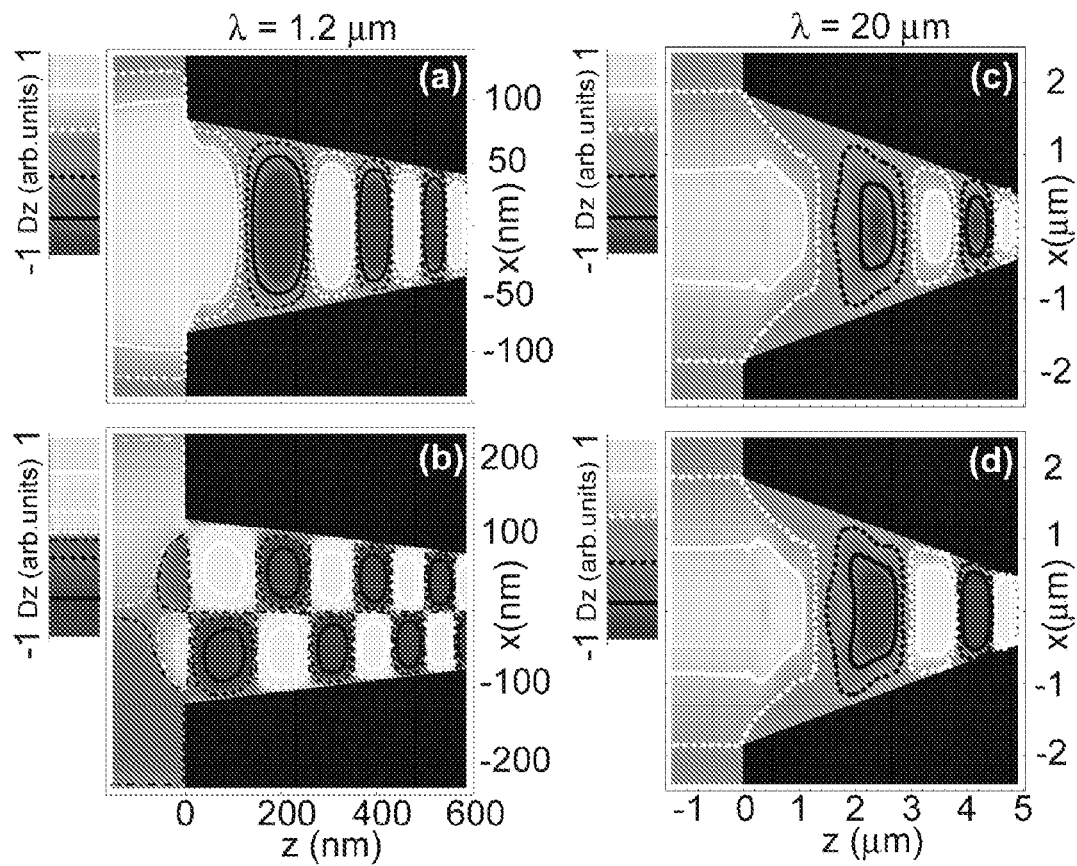
FIGS. 4(a) and (b) illustrate the $TM_{01}$ and $TM_{11}$ mode transfer, respectively, from a homogeneous Si waveguide (z<0) to a Ag—Si PC core photonic funnel (z>0) in accordance with the present invention at $\lambda$=1.2 µm.
FIG. 4(c) illustrates the $TM_{01}$ energy transfer from an AlInAs waveguide (z<0) to a passive InGaAs—AlInAs PC-core (z>0) at $\lambda$=20 µm.
FIG. 4(d) illustrates the $TM_{01}$ energy transfer from an AlInAs waveguide (z<0) to an active InGaAs—AlInAs PC-core at $\lambda=20$ μm.

In FIGS. 3 and 4, a theoretical model of light propagation in PC-based photonic funnels in according with the present invention having PC metamaterial cores such as those described above with reference to FIG. 2 is illustrated. Although the design does not impose any limitations on the waveguide geometry or waveguide boundary material, the photonic funnels of FIGS. 3 and 4 are modeled as having a conical shape, perfectly conducting metallic walls and circular cores, having adiabaticity parameters δ~0.1 ... 0.3. Other geometries or waveguide boundary material could be used in the present invention. For example, the taper from the larger end 114 to the smaller end 116 of the funnel need not be linear or monotonic in its taper.

To compute the light propagation in the conical photonic funnel 100, each funnel 100 is represented by an array of cylindrical segments (in a way, this approach also accounts for the effects related to finite roughness of waveguide walls, unavoidable in any experiment). The typical radius step in the calculations is $10^{-3}λ$. The field is then represented in each cylindrical segment as a series of modes of a circular waveguide. Equations (2,3) are used to calculate a mode propagation in each segment. In these calculations the experimental values of permittivities for Ag, Si, SiC, and AlGaAs are used and the Drude approach is used to describe InGaAs. Finally, the boundary conditions are used to relate the modes in one segment to the modes in the neighboring segment, thus solving the problem of wave propagation through the photonic funnel 100.

Referring then to FIGS. 3(a) and 3(b), the energy propagation through the photonic funnel 100 of the present invention having a mid-IR Si—SiC PC waveguide with positive refraction described above, FIG. 3(b), is compared to the propagation through the Si-core structure with identical geometry, FIG. 3(a). Specifically, the $TM_{01}$ mode propagation (λ=11 μm) from cylindrical Si waveguide, e.g. a fiber (located at z<0), to a photonic funnel (located at z<0) is illustrated. The $D_z$ component is shown, with $D_z$ values of 0.75, 0.25, −0.25, and −0.75 corresponding to the solid white, the dashed white, dashed black, and the solid black contours, respectively (see scale). The funnels of FIGS. 3(a) and 3(b) follow the funnel geometry defined in FIG. 1, and have a length 118 of approximately 10.5 μm, a larger funnel end 114 (at z=0) of R=2.3 μm, and a smaller funnel end 116 (at z≅10.5 μm) of R=0.35 μm~λ/31.

As expected, despite the almost adiabatic radius compression, the energy in Si-core system reflects from the point corresponding to the cut-off radius of about 1.2 μm (dash-dotted lines), FIG. 3(a), with only ~$10^{-10}$ of energy transmitted from the larger funnel end 114 to the smaller end 116. This behavior is similar to that in tips of near-field microscopes. In contrast, for the PC photonic funnel 100 shown in FIG. 3(b) having the above-described Si—SiC PC core, 13% of the energy is transmitted to smaller end 116 and 16% is reflected back to the Si waveguide (located at z<0), FIG. 3(b). The PC photonic funnel of FIG. 3(b) effectively compresses energy, and propagation at the smaller funnel end 116 with radius as small as 0.35 μm≅λ/30 is clearly seen. The dependence of the internal wavelength on the radius may also be noted from FIG. 3(b). The PC photonic funnel 100 provides a solution to the fundamental problem of coupling to the subwavelength domain, transferring 13% of energy, which is 109 times better than its Si counterpart.

A theoretical model of the effective energy transfer across multiple scales in negative-refraction near- and far-IR PC systems is shown in FIGS. 4(a)-(d). As before the $D_z$ component is shown, with $D_z$ values of 0.75, 0.25, −0.25, and −0.75 corresponding to the solid white, the dashed white, dashed black, and the solid black contours, respectively (see scale). The funnels of FIGS. 4(a)-(b) comprise the above-described Ag—Si PC waveguide and follow the funnel geometry defined in FIG. 1: the funnel of FIG. 4(a) has a length 118 of approximately 600 nm, a larger funnel end 114 (at z=0) of R≅85 nm (the radius of feeder waveguide is 130 nm), and a smaller funnel end 116 (at z≅600 nm) of R=40 nm~λ/26; the funnel of FIG. 4(b) has a length 118 of approximately 600 nm, a larger funnel end 114 (at z=0) of R≅110 nm, and a smaller funnel end 116 (at z≅600 nm) of R=75 nm~λ/16. The funnels of FIGS. 4(c)-(d) comprise the above-described passive and active InGaAs—AlInAs PC waveguides, respectively, and follow the funnel geometry defined in FIG. 1: the funnels of FIGS. 4(c)-(d) have a length 118 of approximately 5 μm, a larger funnel end 114 (at z=0) of R≅2 μm, and a smaller funnel end 116 (at z≅600 nm) of R=0.45 μm~λ/44.

FIG. 4(a) illustrates the $TM_{01}$ mode transfer from a Si waveguide (at z<0) of R=135 nm to an Ag—Si PC photonic funnel (at z>0) in accordance with the present invention.

Twenty-four percent of the energy is transmitted from the Si waveguide to the smaller funnel end 116; 21% is reflected back to the Si waveguide. FIG. 4(*b*) illustrates the $TM_{11}$ mode transfer from a Ag—Si PC waveguide photonic funnel (at z>0) to a Si waveguide (at z<0) of R=230 nm: 11% of energy is transferred from the smaller funnel end 116 to the Si waveguide, and 13% is reflected back.

FIG. 4(*c*) illustrates $TM_{01}$ mode transfer from an AlInAs waveguide (at z<0) with R=2.4 μm to a InGaAs—AlInAs PC photonic funnel (at z>0) in accordance with the present invention. Six percent of radiation is transmitted from the AlInAs waveguide to the smaller funnel end 116 FIG. 4(*c*). FIG. 4(*d*) illustrates $TM_{01}$ mode transfer from an AlInAs waveguide with R=2.4 μm to an active InGaAs—AlInAs PC waveguide structure analogous to that described above, but having a material gain ($\in_{AlInAs} \cong 10-i$) to compensate for losses in the funnel structure. The active InGaAs—AlInAs PC waveguide funnel delivers 112% of the energy incident at the larger funnel end 114 to the smaller funnel end 116, FIG. 4(*d*).

Thus, it is clearly seen that the mode propagation in n<0 systems, FIG. 4, is qualitatively similar to the one in n>0 waveguides, FIG. 3. However, the existence of the maximum cut-off radius may require radius mismatch between the "feeder" waveguide (e.g., the depicted Si fiber) and the photonic funnel waveguide, as illustrated in FIG. 4. The calculations suggest that Ag—Si system may be used to transfer more than 20% of energy to near-field zone. It is expected that this number can be further optimized by reducing the wave reflection (currently 21%). The same system may be used to transfer the energy from nm-sized spots to far-field. The results demonstrate 11% energy transmission in $TM_{11}$ mode, FIG. 4(*b*). The performance of the far-IR system is similar to that of Si—Ag composite (FIG. 3(*c*)), and, similar to FIG. 3, the internal wavelength is proportional to R.

Having demonstrated the design and operation of the PC-based metamaterial photonic funnel 100 in accordance with the present invention, further designs and analysis turn to the study of the effects related to waveguide boundaries and material composition.

Design and Analysis of Effects of Waveguide Boundaries and Material Composition

Light Transmission in Waveguides with Perfectly Conducting Walls

Figure 5:
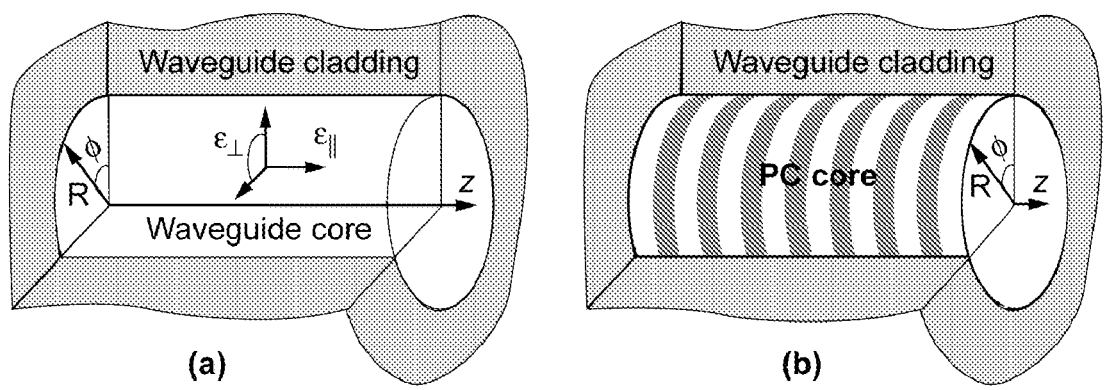
FIG. 5(a) schematically illustrates the geometry of a waveguide with strongly anisotropic dielectric core, and FIG. 5(b) schematically illustrates a nano-layered metal-dielectric metamaterial realization of a strongly anisotropic core.

For analysis of the waveguide boundary effects in a cylindrical waveguide, it is convenient to develop a similar formalism to that given above but using cylindrical coordinates. The geometry of the light transmission considered in this analysis is schematically shown in FIG. 5. The direction of light propagation is assumed to coincide with the z axis of a cylindrical coordinate system. The optical axis of the anisotropic core material is assumed to be parallel to the z direction; $\in_{\parallel}$ and $\in_{\perp}$ denote the values of the effective dielectric permittivity parallel and perpendicular to optical axis respectively.

Following the formalism developed above, the waves propagating in a waveguide with perfectly conducting walls can be represented as a series of (TE) and (TM) modes. Each mode has its own spatial structure across the waveguide, determined by a structural parameter κ as described below. From Eq. (1) above, the propagating component of the mode's wavevector can be related to its frequency through the free-space-like dispersion relation $$k_z^2 = \varepsilon v \frac{\omega^2}{c^2},$$

where ω is the angular frequency of light, c is the speed of light in the vacuum, and the polarization-dependent propagation constants are $$\varepsilon_{TE} = \varepsilon_{TM} = \varepsilon_{\perp}, \qquad (5)$$

$$v_{TE} = 1 - \frac{\kappa^2 c^2}{\varepsilon_{\perp} \omega^2},$$

$$v_{TM} = 1 - \frac{\kappa^2 c^2}{\varepsilon_{\parallel} \omega^2}.$$

For TM waves the structural parameter κ and the mode structure across the waveguide can be related to the z component of E field, which is in turn is determined from the differential equation $$\Delta_2 E_z + \kappa^2 E_z = 0, \qquad (6)$$

with $\Delta_2$ being the 2D Laplacian operator, and an additional condition that the electric field $E_z$ satisfies the boundary conditions along the core-cladding interface. Although Eq. (6) determines the mode structure in a waveguide with arbitrary cross-section, for this analysis a cylindrical waveguide is considered to illustrate the approach. In this geometry the structure of TM modes is described by $E_z(r,\phi,z) \propto J_m(\kappa_{TM}^0 r) e^{im\phi + ik_z z}$. Similar considerations relate TE waves to $H_z(r,\phi,z) \propto J_m(\kappa_{TE}^0 r) e^{im\phi + ik_z z}$. The structural parameters are:

$$\kappa_{(TM|TE)}^0 = \frac{X_{(TM|TE)}}{R} \qquad (7)$$

where R is a waveguide radius and X is given by $J_m(X_{TM})=0$ for TM waves and $J'_m(X_{TE})=0$ for TE waves, respectively.

The dispersion equation Eq. (1) is fundamentally similar to the dispersion of a plane wave in an isotropic material. Indeed, the combination $n = k_z c/\omega = \pm \sqrt{\varepsilon v}$, which plays a role of the effective index of refraction, is combined from two (mode-dependent) scalar quantities, $\in$ and v. The mode propagation requires both propagation constants to be of the same sign.

Again, while the parameter $\in$ depends solely on the dielectric properties of the core material, the propagation parameter v can be controlled (through κ), by changing the waveguide (or mode) geometry. Since κ is inversely proportional to the waveguide size (see Eq. (7)), there exists a cut-off radius $R_{cr} \sim \lambda/2$, corresponding to v=0 for every free-space-like mode propagating in the waveguide with isotropic dielectric core. The modes propagate in structures with $R > R_{cr}$, and are reflected from thinner systems. This appearance of the cut-off radius in all dielectric waveguides can be considered as a manifestation of a diffraction limit—it is impossible to localize a combination of plane waves to a region much smaller than the wavelength inside the material $\lambda = \lambda_0/n$, with $\lambda_0$ being free space wavelength.

As noted above, anisotropy of the dielectric constant makes the TM-mode parameters $\in$ and v completely independent of each other (TE waves are not affected by material anisotropy), and extremely anisotropic optical materials may be used to achieve the volume mode propagation in deep subwavelength waveguides. As it directly follows from Eqs. (1,5), when ($\epsilon_\perp>0, \epsilon_\parallel<0$), the parameter ν is positive regardless the size of the system. Thus, the cut-off radius does not exist at all, and the decrease of the waveguide radius is accompanied by the decrease of the internal wavelength of the mode $2\pi/k_z \propto R$, in a sense "postponing" the diffraction limit in the system. The case of opposite anisotropy ($\epsilon_\perp<0, \epsilon_\parallel>0$) is of a special interest. The mode propagation is now possible only when ν<0, which in turn requires the waveguide cross-section to be extremely small. Furthermore, causality arguments now require the phase velocity of a propagating mode to be negative. In a sense, such a waveguide is a complete antipode of a conventional dielectric fiber, in terms of phase propagation, as well as in terms of cut-off radius. The former case corresponds to a negative refraction ($\epsilon_\perp<0, \epsilon_\parallel>0$), while the latter describes positive refraction case ($\epsilon_\perp>0, \epsilon_\parallel<0$).

Material Inhomogeneity and Subwavelength Light Propagation

As demonstrated above, confinement of the propagating waves to deep subwavelength areas requires extremely strong anisotropy of the dielectric core. Strong anisotropy of permittivity has been so far identified for the far-IR (sapphire) or THz (Bi) frequency ranges The required anisotropy can also be achieved in nanostructured composites—also known as metamaterials. To provide a negative real part of the permittivity, the building blocks of strongly anisotropic metamaterial should either have negative permittivity or exhibit a geometric dipole resonance (for example, Mie-type resonance). Negative permittivity in optical domain is often achieved in metals due to Drude response of their plasma-like free electrons.

In particular, the anisotropic response can be achieved in an array of metal-dielectric nanolayers shown in FIG. 5(b). When the characteristic thickness of each individual layer becomes small in comparison with typical scale of field variation (smaller of $2\pi/k_z$, $2\pi/\kappa_{TE}$, $2\pi/\kappa_{TM}$), the response of metal-dielectric nanolayered composite is adequately described by the effective-medium theory (EMT):

$$\varepsilon_\perp = \frac{a_d \varepsilon_d + a_m \varepsilon_m}{a_d + a_m}, \qquad (8)$$

$$\varepsilon_\parallel = \frac{(a_d + a_m)\varepsilon_d \varepsilon_m}{a_d \varepsilon_m + a_m \varepsilon_d},$$

where $\alpha_d$, $\alpha_m$ and $\epsilon_d>0$, $\epsilon_m<0$ are thicknesses and permittivities of dielectric and metal layers respectively.

As an example, in the analysis of this section the core material is composed of 15 nm-thick layers of Ag (modeled using Drude approach) and Si ($\epsilon_{Si}=12$), though other materials may be used to provide a PC waveguide in accordance with the present invention. As it directly follows from Eq. (8), this system works as right-handed ($\epsilon_\parallel=-59.48+2.78i$, $\epsilon_\perp=1.72+0.06i$) for $\lambda_0=500$ nm, and as left-handed ($\epsilon_\parallel=28.72+0.12i$, $\epsilon_\perp=-30.51+0.77i$) for $\lambda_0=1.2$ μm. The mode behavior in these systems is illustrated in FIGS. 2(c) and (d) (solid line). Two approaches are used to calculate the propagation constant of the mode in each system: 1) EMT (Eq. (8)), and 2) an analytic solution of light transmission though a 1D periodic layer array. The predictions of both techniques are almost identical for the thicker waveguides, but strongly disagree for thinner systems. In fact, the inhomogeneous microstructure of the waveguide core introduces the cut-off radius in anisotropy-based systems. While the appearance of such a critical radius may seem similar to the one in "conventional" dielectric fibers, the two have fundamentally different origins. In homogeneous systems the wave propagation becomes impossible when one tries to confine the propagating wave to a spatial area smaller than the wavelength. In metamaterial-based structures, on the other hand, the wavelength "self-adjusts" to the waveguide radius. The mode cut-off in this case has its origin in the break-up of the EMT when the internal field variation scale [$\Lambda = \min(2\pi/k_z, 2\pi/\kappa)$] becomes comparable to an inhomogeneity scale [$\Delta \simeq (\alpha_d+\alpha_m)$].

While thinner layers may in principle allow unrestricted confinement of free-space light, in reality such a confinement will be limited by finite-size corrections to the material properties of the layers (spatial dispersion, Landau damping). For metals, the minimum layer thickness can be estimated using $$d_m^{min} \approx \lambda_0 \frac{v_f}{c} \sim \frac{\lambda_0}{100}, \qquad (9)$$

with $v_f$ being the Fermi velocity.

The range of wave propagation in metamaterial-core waveguides is affected not only by spatial dispersion, but also by implicit material absorption. For the systems that can be successfully treated with EMT, the field attenuation given by the imaginary part of the propagation constant, $k_z$, depends on waveguide geometry along with material properties (see Eq. (1)). For $TM_{01}$ modes in Ag-based systems with R=80 nm the attenuation is dominated by absorption inside Ag. It is estimated that the intensity of the light attenuates in e times on the length of 1.5 μm. This attenuation, although it is acceptable for the short-range signal transfer, may be further compensated or even reversed, by implementing the gain into the "dielectric" component of a metamaterial, as demonstrated in FIG. 4(d).

Effect of Waveguide Walls

Turning then to the effect of waveguide walls (dielectric or metallic) on the mode dynamics, similar to the case of perfectly conducting walls described above, the light propagation in fibers with any isotropic cladding can be related to the propagating waves with TE and TM polarizations. In this approach, the field is represented as a series of TM and TE waves with same propagating constant $k_z$ and frequency ω, and the boundary conditions are used to find the effective refractive index $n=k_z c/\omega$. Note that the TE and TM components of the mode have similar but not identical spatial structure inside the anisotropic core. Explicitly, this structure is given by $J_m(\kappa_{(TE|TM)}r)\exp(im\phi)$ with $\kappa_{TE}^2 = \epsilon_\perp \omega^2/c^2 - k_z^2$, and $\kappa_{TM}^2 = \epsilon_\parallel(\omega^2/c^2 - k_z^2/\epsilon_\perp)$. The mode structure in the cladding material is described by $K_m(\kappa_{cl}r)\exp(im\phi)$ with $\kappa_{cl}^2 = k_z^2 - \epsilon_{cl}\omega^2/c^2$, and $\epsilon_{cl}$ being the permittivity of the cladding. The boundary condition matching yields the following dispersion relation for a propagation constant of a mode in a waveguide with an anisotropic core:

$$[J_m^\ddagger(\kappa_{TE}R) + K_m^\ddagger(\kappa_{cl}R)][\varepsilon_\parallel J_m^\ddagger(\kappa_{TM}R) + \varepsilon_{cl} K_m^\ddagger(\kappa_{cl}R)] = \qquad (10)$$

$$\frac{1}{k_z^2}\frac{m^2\omega^2}{R^2 c^2}\left(\frac{\varepsilon_\perp}{\kappa_{TE}^2} + \frac{\varepsilon_{cl}}{\kappa_{cl}^2}\right)\left(\frac{\varepsilon_\parallel}{\kappa_{TM}^2} + \frac{\varepsilon_{cl}}{\kappa_{cl}^2}\right)$$

where $L_m^\ddagger(\kappa R) = L_m'(\kappa R)/[\kappa L_m(\kappa R)]$. The two terms in the left-hand side of the equation correspond to the contributions from TE and TM modes respectively. As it follows from Eq. (10), the "pure" TM and TE modes are only possible when (i) m=0, or (ii) $\in_{cl} \to \infty$. The latter case corresponds to perfectly conducting metallic walls described above. Solutions of Eq. (10) can be separated into two fundamentally different groups: 1) the ones with $\kappa_2(TE|TM)>0$ which describe volume modes, and 2) the ones with $\kappa_2(TE|TM)<0$ which correspond to surface waves.

It is possible to dramatically simplify Eq. (10) for the case of waveguides with metallic walls. At optical or infrared frequencies, the permittivity of metals is dominated by a plasma-like response of their free electrons. As a result, this permittivity is negative and $|\in_{cl}| \gg 1$. A straightforward Taylor expansion of Eq. (10) yields $$k_z^{TM} \simeq k_z^{(0)}\left(1 + \frac{\omega \varepsilon_\perp}{c k_z^{(0)2} R} \frac{1}{\sqrt{-\varepsilon_{cl}}}\right), \quad (11)$$

$$k_z^{TE} \simeq k_z^{(0)}\left[\begin{array}{c} 1 - \frac{c \kappa_{TE}^{(0)2} J_m(\kappa_{TE}^{(0)} R)}{\omega k_z^{(0)2} R J_m''(\kappa_{TE}^{(0)} R)} \\ \left(1 + \frac{k_z^{(0)2} m^2 \varepsilon_\parallel}{\varepsilon_\perp \kappa_{TE}^{(0)2} \kappa_{TM}^{(0)2} R^2}\right) \frac{1}{\sqrt{-\varepsilon_{cl}}} \end{array}\right],$$

where the superscript (0) denotes the mode parameters in a waveguide with perfectly conducting walls. Note that similar to planar waveguides, a finite value of the permittivity of the waveguide wall leads to a mode expansion into the cladding region.

Besides affecting the mode propagation constant, the cladding material in fiber systems also affects the mode structure. In fact, the m≧1 mode of a cylindrical waveguide with real (metal or dielectric) walls can be represented as a linear combination of TE and TM waves, known as HE or EH waves. In particular, the HE wave can be represented as a combination of the TM mode with an admix of the TE mode: $E_z \propto J_m(\kappa_{TM}r)\exp(im\phi), H_z \propto \alpha J_m(\kappa_{TE}r)\exp(im\phi)$, with the admix parameter α given by:

$$\alpha = \frac{i\omega k_z m \varepsilon_\parallel (\varepsilon_\perp - \varepsilon_{cl})}{c \varepsilon_\perp \kappa_{cl}^2 \kappa_{TM}^2 R} \cdot \frac{J_m(\kappa_{TM} R)}{J_m^\ddagger(\kappa_{TE} R) + K_m^\ddagger(\kappa_{cl} R)} \quad (12)$$

Note that the effect of mode structure modification is unique to fiber-geometries and is not observed in planar waveguides. Our calculations show that for Ag walls, this admix in the $HE_{11}$ mode is below 2%.

As noted before, the TE (EH) modes are (almost) unaffected by the material anisotropy. Therefore the properties of these waves are identical to the properties of TE modes in waveguides with isotropic core.

Figure 6:
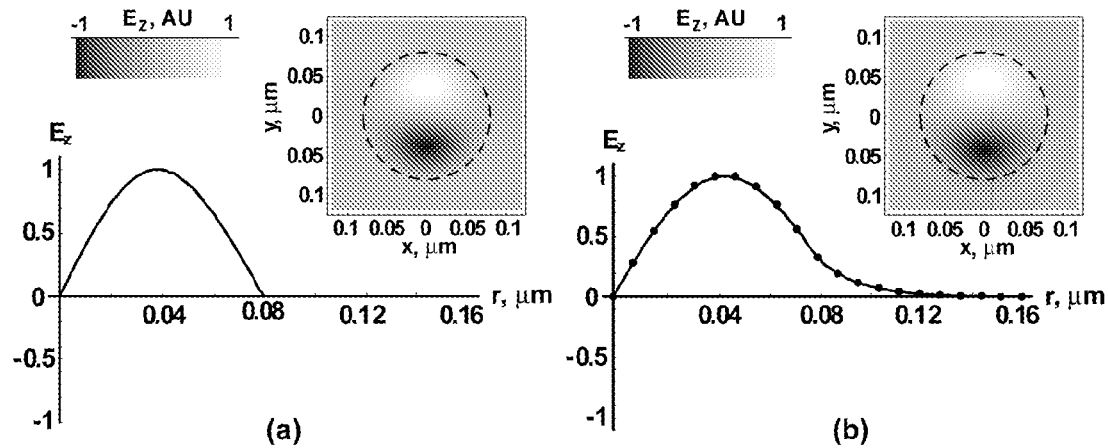
FIG. 6 illustrates the $TM_{11}$ ($HE_{11}$) volume modes in a PC waveguide with an anisotropic Si—Ag composite core at $\lambda_0=1.2$ μm, with FIG. 6(a) corresponding to perfectly conducting waveguide walls and FIG. 6(b) showing the mode in a waveguide with Ag cladding.

In FIG. 6 a propagating volume mode in the Ag—Si PC-waveguide system described above is illustrated for $\lambda_0=$ 1.2 μm, with the solid line representing exact results per Eq. (10) and the dots corresponding to perturbative Eq. (11). For comparison, the mode structure is shown for the Ag—Si waveguide with both perfectly conducting (FIG. 6(a)) and Ag (FIG. 6(b)) walls. It is clearly seen that for the silver-walled waveguide, the mode structure is well-described by the perturbative result Eq. (11).

Figure 7:
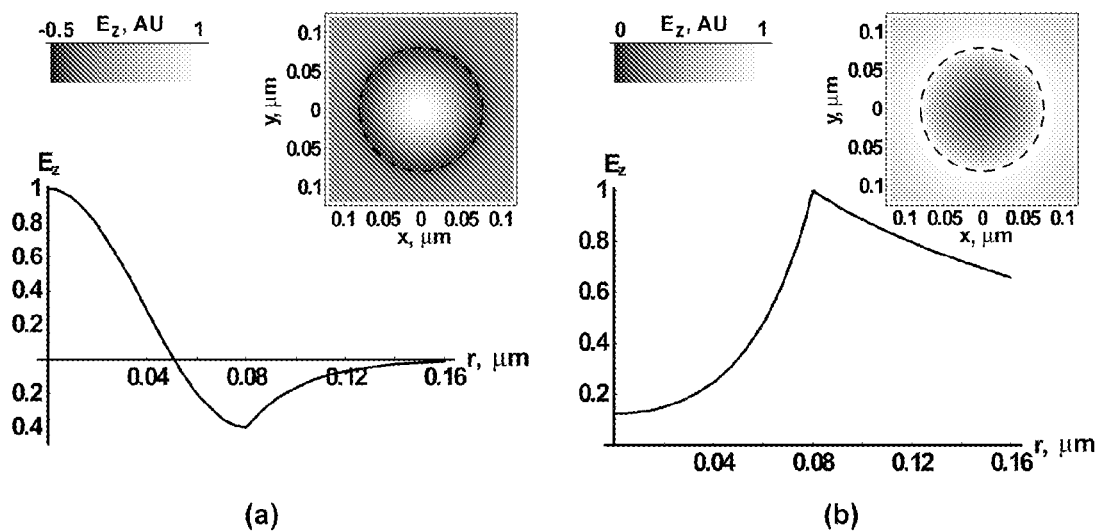
FIG. 7(a) illustrates the $TM_{02}$ mode at $\lambda_0=1.2$ μm in the free-standing Si—Ag PC waveguide core ($\epsilon_{c1}=1$) of FIG. 6.
FIG. 7(b) illustrates a surface plasmon polariton mode propagating at Ag-Air interface for comparison.

The exact dispersion relation (Eq. (10)) is also used to calculate the modes in the Ag—Si PC-waveguide without cladding, with these modes compared to the surface polariton mode on a Ag nanowire. The results of these simulations are shown in FIG. 7, where it is clearly seen that the structure of the surface polariton mode (localized at core-cladding boundary), FIG. 7(b), is fundamentally different from the structure of the volume modes of the unclad Ag—Si PC-waveguide, FIG. 7(a). It is also seen that surface waves have weaker confinement than their volume counterparts in the Ag—Si PC-waveguide.

Gain-Assisted Slow to Superluminal Group Velocity Manipulation in Nano-Waveguides This section demonstrates that the mechanism of material gain, previously used for loss compensation with reference to FIG. 4(d), is also a powerful tool to manipulate dispersion and propagation characteristics of electromagnetic pulses at the nanoscale. It is shown theoretically that the group velocity in lossy nano-waveguides can be controlled from slow to superluminal values by the material gain and waveguide geometry, and an analytical description of the relevant physics is developed. The developed formalism is utilized to show that gain-assisted dispersion management can be used to control the transition between "photonic-funnel" and "photonic-compressor" regimes in tapered nano-waveguides. The phenomenon of strong modulation of group velocity in subwavelength structures can be realized in waveguides with different geometries, and is present for both volume and surface-modes. Even relatively weak material gain, which is unable to compensate losses, is capable of producing large variations of the group velocity, bringing such exotic phenomena as slow ($0<v_g \ll c$) and ultra-fast ($v_g<0$) light to the nanoscale domain. However, in contrast to bulk media, where the group velocity is controlled solely by material dispersion, the pulse propagation in nano-waveguides is also strongly affected by the waveguide geometry. The interplay between material- and geometry-induced modal dispersion provides a possibility of strong group velocity modulation even when the material dispersion $|d\in/d\omega|$ is relatively weak.

In tapered waveguides the above interplay leads to the transition between the photonic compressor regime, where the reduction of phase velocity is accompanied by the simultaneous reduction of group velocity and the photonic funnel regime where the product of phase and group velocities remains constant. The developed formalism is illustrated on the examples of two fundamentally different nano-waveguides: a surface-mode-based plasmonic nanorod and a volume-mode fiber with anisotropic core. Applications include nanosized tunable delay lines, all-optical buffers and data synchronizers.

Figure 8:
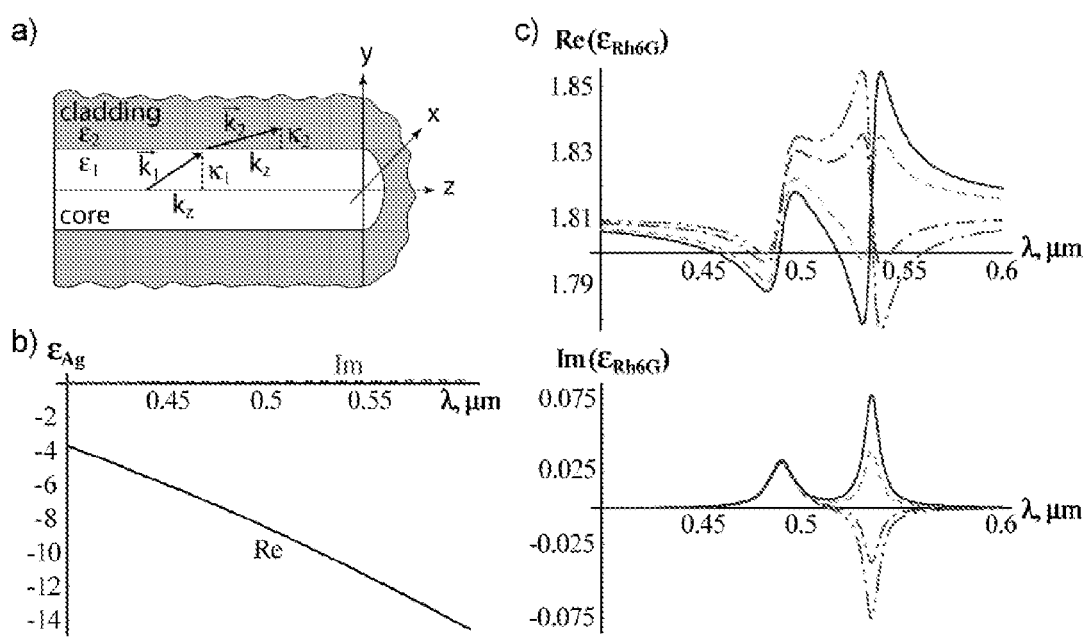
FIG. 8(a) schematically illustrates the geometry of a two-layer cylindrical waveguide with axial symmetry.
FIG. 8(b) illustrates the dielectric permittivity of Ag, with the real and imaginary parts are shown solid and dashed, respectively.
FIG. 8(c) illustrates the real (top panel) and imaginary (bottom panel) parts of the dielectric permittivity of a Rhodamine-6G model, where the solid, dashed, dash-dotted, and dash-dot-dotted lines correspond to gain values of 0%, 33%, 66% and 100%, respectively.

The geometry of a typical waveguide structure is schematically shown in FIG. 8(a). For simplicity, the system is assumed homogeneous along the propagation direction (z axis); the transverse structure of the waveguide is represented as a set of N layers with different permittivities. Any wavepacket, propagating in such The apparatus can be described as a linear combination of waveguide modes, with each such mode having its own dispersion relation between propagation constant $k_z$ and frequency ω.

To find this relation, represent the field in i-th layer is represented by a linear combination of waves traveling in opposite directions across the layer, having the same z-dependence, but different cross-sectional structure (described by parameters $\alpha_1$). The fields in each layer are related to the fields in the neighboring layers through the boundary conditions, leading to the waveguide matrix $\mathbb{M}$ that relates the (complex) amplitudes of waves in all layers. Since a waveguide mode corresponds to a nontrivial solution of the system of algebraic equations described by $\mathbb{M}$, the modal dispersion equation can be found using:

$$\mathbb{D}(k_z, \omega, \vec{\kappa}) = \det \mathbb{M} = 0. \tag{13}$$

where $\vec{\kappa}$ is a vector constructed of $\kappa_i$, which in turn are found from the wave- and layer-specific dispersion equations for individual waves:

$$D_i(k_z, \omega, \kappa_i) = 0. \tag{14}$$

Equations (13, 14) provide a complete description of electromagnetism in multi-layered waveguides. In particular, the group velocity is found by differentiating Eqs. (13, 14) with respect to $k_z$:

$$\frac{d\mathbb{D}}{dk_z} = \frac{\partial \mathbb{D}}{\partial k_z} + \frac{\partial \mathbb{D}}{\partial \omega} v_g + \sum_i \frac{\partial \mathbb{D}}{\partial \kappa_i} \frac{\partial \kappa_i}{\partial k_z} = 0, \tag{15}$$

$$\frac{dD_i}{dk_z} = \frac{\partial D_i}{\partial k_z} + \frac{\partial D_i}{\partial \omega} v_g + \frac{\partial D_i}{\partial \kappa_i} \frac{\partial \kappa_i}{\partial k_z} = 0,$$

leading to $$v_g = -\frac{\sum_i \frac{\partial \mathbb{D}}{\partial \kappa_i} \left(\frac{\partial D_i}{\partial \kappa_i}\right)^{-1} \frac{\partial D_i}{\partial k_z} - \frac{\partial \mathbb{D}}{\partial k_z}}{\sum_i \frac{\partial \mathbb{D}}{\partial \kappa_i} \left(\frac{\partial D_i}{\partial \kappa_i}\right)^{-1} \frac{\partial D_i}{\partial \omega} - \frac{\partial \mathbb{D}}{\partial \omega}}. \tag{16}$$

The number of terms in the summations in Eq. (16) (the length of $\vec{\kappa}$) depends on the waveguide symmetry and individual layer properties. Thus, when the system has axial symmetry (see FIG. 8(a)), each layer with isotropic permittivity adds one $\kappa$ per "axial number" m, each layer with uniaxial anisotropy adds two such terms, etc. Equation (16) can be used for an arbitrary waveguide geometry including planar, square (plane waves), circular, and oval (cylindrical waves) systems, and can be applied to plasmonic, coaxial, and volume waveguide modes. To illustrate the developed formalism two axially-symmetric cylindrical nano-waveguides are considered: 1) a plasmonic nanorod in the dielectric material and 2) a photonic funnel with anisotropic core.

In the case of the plasmonic waveguide the z component of the m-th cylindrical wave inside and outside the metal nanorod can be represented by $I_m(\kappa_1 r) e^{im\phi + ik_z z - i\omega t}$ and $K_m(\kappa_2 r) e^{im\phi + ik_z z - i\omega t}$ respectively, with $I_m$ and $K_m$ being modified Bessel functions, and $\kappa_{1,2}^2 = k_z^2 - \epsilon_{1,2} \omega^2 / c^2$. The boundary-matching technique described above yields the following set of dispersion equations for the first (m=0) TM surface Plasmon polariton (SPP) mode:

$$\mathbb{D}^{SPP} = \frac{\varepsilon_1}{\varepsilon_2} \frac{I_1(\kappa_1 R)}{\kappa_1 I_0(\kappa_1 R)} + \frac{K_1(\kappa_2 R)}{\kappa_2 K_0(\kappa_2 R)} \tag{17}$$

$$D_{1,2}^{SPP} = \varepsilon_{1,2} \frac{\omega^2}{c^2} - k_z^2 + \kappa_{1,2}^2.$$

Direct substitution of Eqs. (17) into Eq. (16) yields:

$$v_g v_p = \left( \sum_{i=1}^{2} \frac{\partial \mathbb{D}^{SPP}}{\partial \kappa_i} \frac{1}{\kappa_i} \right) \left[ \begin{array}{c} \sum_{i=1}^{2} \frac{\partial \mathbb{D}^{SPP}}{\partial \kappa_i} \frac{1}{\kappa_i} \left( \varepsilon_i + \frac{\omega}{2} \frac{d\varepsilon_i}{d\omega} \right) \\ \frac{c^2}{\omega} \frac{\varepsilon_1}{\varepsilon_2} \frac{I_1(\kappa_1 R)}{\kappa_1 I_0(\kappa_1 R)} \\ \left( \frac{1}{\varepsilon_1} \frac{d\varepsilon_1}{d\omega} - \frac{1}{\varepsilon_2} \frac{d\varepsilon_2}{d\omega} \right) \end{array} \right]^{-1} \tag{18}$$

with $v_p$ being phase velocity of the mode:

$$v_p = \frac{\omega}{k_z}. \tag{19}$$

When the nanorod radius is much smaller than the free-space wavelength ($R \ll \lambda_0$), $\kappa_{1,2}$ are proportional to $1/R$. In this regime the phase velocity of the SPP is proportional to the radius, the terms involving $\mathbb{D}^{SPP}$ in Eq. (19) are proportional to $R^3$, while the remaining term is proportional to R.

The dramatic effect of material dispersion on the relationship between the phase and group velocities is now clearly seen. In contrast to $v_g = v_p = c/n$, observed in bulk dispersionless media, in the absence of material dispersion waveguide modes obey the relationship $v_g v_p = \text{const}$, and the decrease of phase velocity with the radius is accompanied by the increase of group velocity, similar to anisotropy-based photonic funnels.

Any non-vanishing dispersion, however, dramatically changes this behavior and leads to the regime when both $v_p$ and $v_g$ simultaneously vanish. This regime, that originates from the material dispersion of plasmonic composites, has been shown to yield slow light in nanoscale plasmonic waveguides and in adiabatic plasmonic energy compressors.

A significant feature of designs of the present invention is that the dispersion of the dielectric core can be used to control the group velocity of the SPP by adjusting the term $$\left( \frac{1}{\varepsilon_1} \frac{d\varepsilon_1}{d\omega} - \frac{1}{\varepsilon_2} \frac{d\varepsilon_2}{d\omega} \right)$$

in Eq. (19). This way the nanoplasmonic system switches between "photonic funnel" and "photonic compressor" regimes. The group velocity can be independently controlled by either material dispersion or waveguide radius. It is therefore possible to build plasmonic systems with either "fast" or "slow" modes (see FIG. 9), or implement an adjustable gain mechanism to tune in between these two regimes. It is also possible to construct a tapered plasmonic fiber in which plasmonic packets would travel with superluminal speeds at larger radii, and compress (slow down) toward the small-radius apex.

To further demonstrate this behavior and show the control over the group velocity with the material gain, the dispersive properties of a silver nanorod (described by Drude model, FIG. 8(b)) are modeled by:

$$\varepsilon_1(\omega) = \varepsilon^{Ag} = \varepsilon_\infty^{Ag} - \frac{\omega_p^2}{\omega(\omega + i\gamma_p)}, \quad (20)$$

with the nanorod submerged into a 10% solution (0.1–M) of Rhodamine-6G in Methanol (Rh6G), which in the optical frequency range can be approximated by:

$$\varepsilon_2(\omega) = \varepsilon^{Rh6G} = \varepsilon_\infty^{Rh6G} + \sum_{j=1}^{2} \frac{A_j \omega_{(0)j}^2}{\omega_{(0)j}^2 - \omega^2 - i\gamma_j \omega}. \quad (21)$$

In these calculations $\varepsilon_\infty^{Ag}=5$, $\omega_p=46.26\,\mu m^{-1}$, $\gamma_p=0.11\,\mu m^{-1}$ for silver and $\varepsilon_\infty^{Rh6G}=1.81$, $\gamma_1=0.4\,\mu m^{-1}$, $\omega_{(0)_1}=12.82\,\mu m^{-1}$, $\gamma_2=0.2\,\mu m^{-1}$, $\omega_{(0)_2}=11.74\,\mu m^{-1}$ for Rhodamine. The material gain is modeled by fixing $A_1=0.001$ and adjusting $A_2$ to gradually change the corresponding resonance strength. On the microscopic level, this process corresponds to a gradual increase of the population of the excited level of Rh6G with respect to the ground-state population, achievable, for example, by an external pump. The dependence of the dielectric permittivity of Rh6G on the material gain measured in percents of the excited state population is illustrated in FIG. 8(c). In the remainder of this analysis, the regime is assumed to have less than 50% of population in the excited state, corresponding to $A_2>0$ ($A_2<0$ represents an inverted system).

Figure 9:
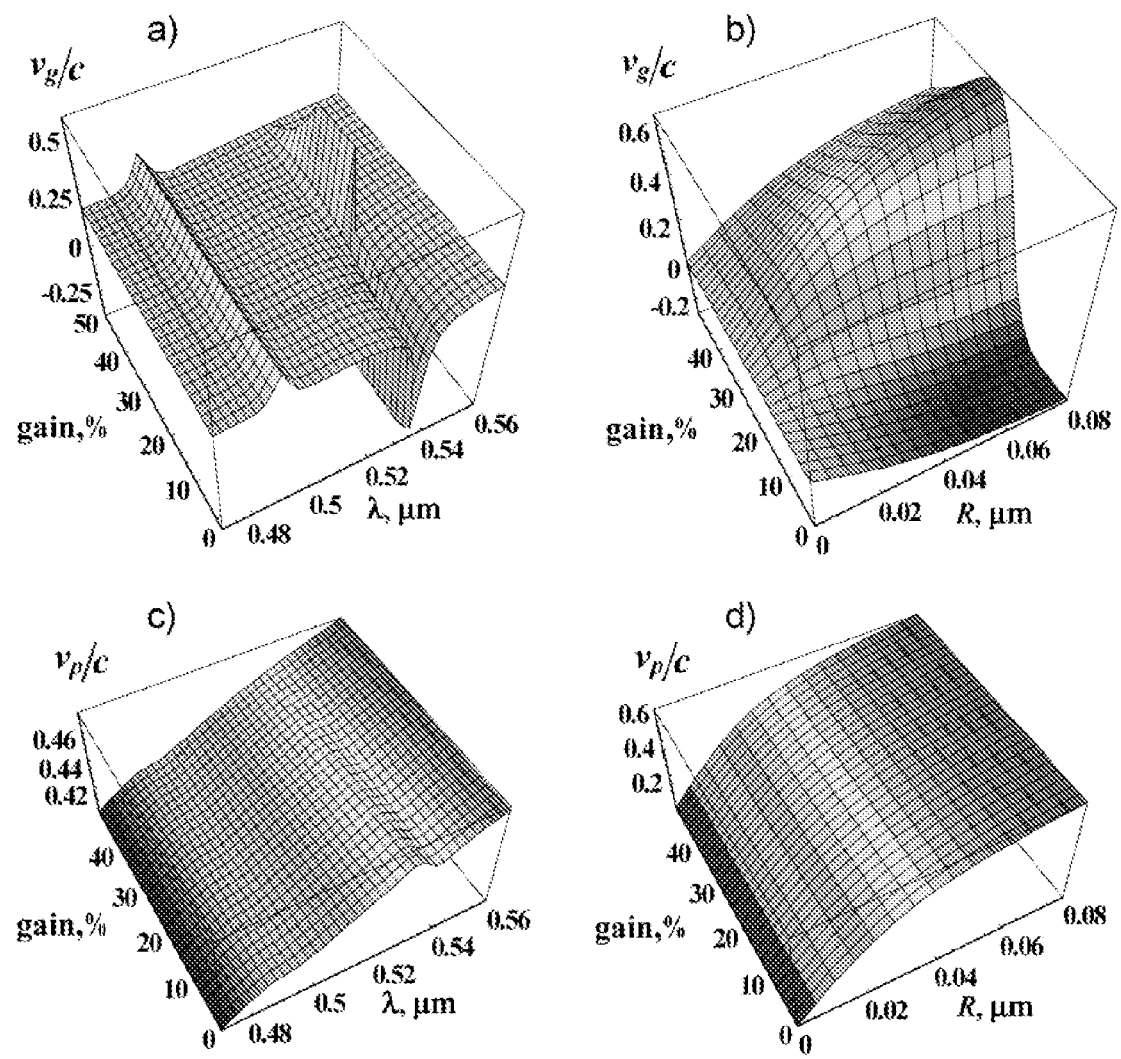
FIG. 9(a) illustrates the group velocity of a surface plasmon polariton on a metal nanorod in a Rh6G methanol solution as a function of gain and wavelength at R=35 nm.
FIG. 9(b) illustrates the phase velocity of the system of FIG. 9(a) as functions of gain and wavelength at R=35 nm.
FIG. 9(c) illustrates the group velocity of the system of FIG. 9(a) as functions of gain and radius at $\lambda=534$ nm.
FIG. 9(d) illustrates the phase velocity of the system of FIG. 9(a) as functions of gain and radius at $\lambda=534$ nm.

The group and phase velocities of the SPP at the Ag—Rh6G interface are shown in FIG. 9. As mentioned above, the gain level used is relatively weak. Indeed, the phase velocity is almost unaffected by the material gain (see FIGS. 9(c), 9(d)). Furthermore, the imaginary part of $\varepsilon_2$ and of propagation constant $k_z"$ remain positive, indicating that the gain is insufficient to compensate SPP losses. Both superluminal ($v_g<0$) and slow ($0<v_g<<c$) light regimes can be identified in active nanoplasmonic structures. While the SPP mode remains lossy, the total absorption in the fast- and slow-light regions is relatively small. The corresponding parameter $|k_z"/k_z|<0.05$.

When the gain is close to 25%, the group velocity undergoes the transition from superluminal to slow light at a constant pumping level with varying nanorod radius. Similarly, at R=35 nm, the superluminal to slow light transition happens as a function of pumping, providing almost unlimited control over the group velocity of the SPPs at the nanoscale.

To demonstrate universality of nanoscale group velocity modulation with respect to waveguide modes, the developed formalism of the photonic funnel is applied. These anisotropy-based systems support volume modes with either positive or negative refractive index and can be easily integrated with diffraction-limited fibers. In the simplest case of a $TM_{01}$ mode in cylindrical geometry with uniaxial dielectric core with optical axis parallel to the direction of mode propagation and perfectly conducting metallic walls, Eqs. (13-14) become:

$$\mathbb{D}^{AN} = J_0(\kappa_1 R) \quad (22)$$

$$D_1^{AN} = \frac{\omega^2}{c^2} - \frac{k_z^2}{\varepsilon_{xy}} - \frac{\kappa_1^2}{\varepsilon_z}$$

where $\varepsilon_{xy}$ and $\varepsilon_z$ are the components of effective dielectric permittivity perpendicular and parallel to z-direction, and $J_0$ is a Bessel function of the first kind. In the nanoscale limit ($R<<\lambda_0$) Eq. (16) becomes:

$$v_g v_p = \frac{c^2}{\varepsilon_{xy}} \left[ 1 + \frac{c^2 \kappa_1^2}{2\omega} \left( \frac{1}{\varepsilon_z^2} \frac{d\varepsilon_z}{d\omega} - \frac{1}{\varepsilon_{xy}\varepsilon_z} \frac{d\varepsilon_{xy}}{d\omega} \right) \right]^{-1}. \quad (23)$$

Similar to what has been shown earlier for the SPP mode, this expression represents the interplay between the "funnel limit" $v_g v_p = c^2/\varepsilon_{xy}$=const and the "compressor limit" $v_g v_p \propto 1/\kappa_1^2 \propto R^2$.

Figure 10:
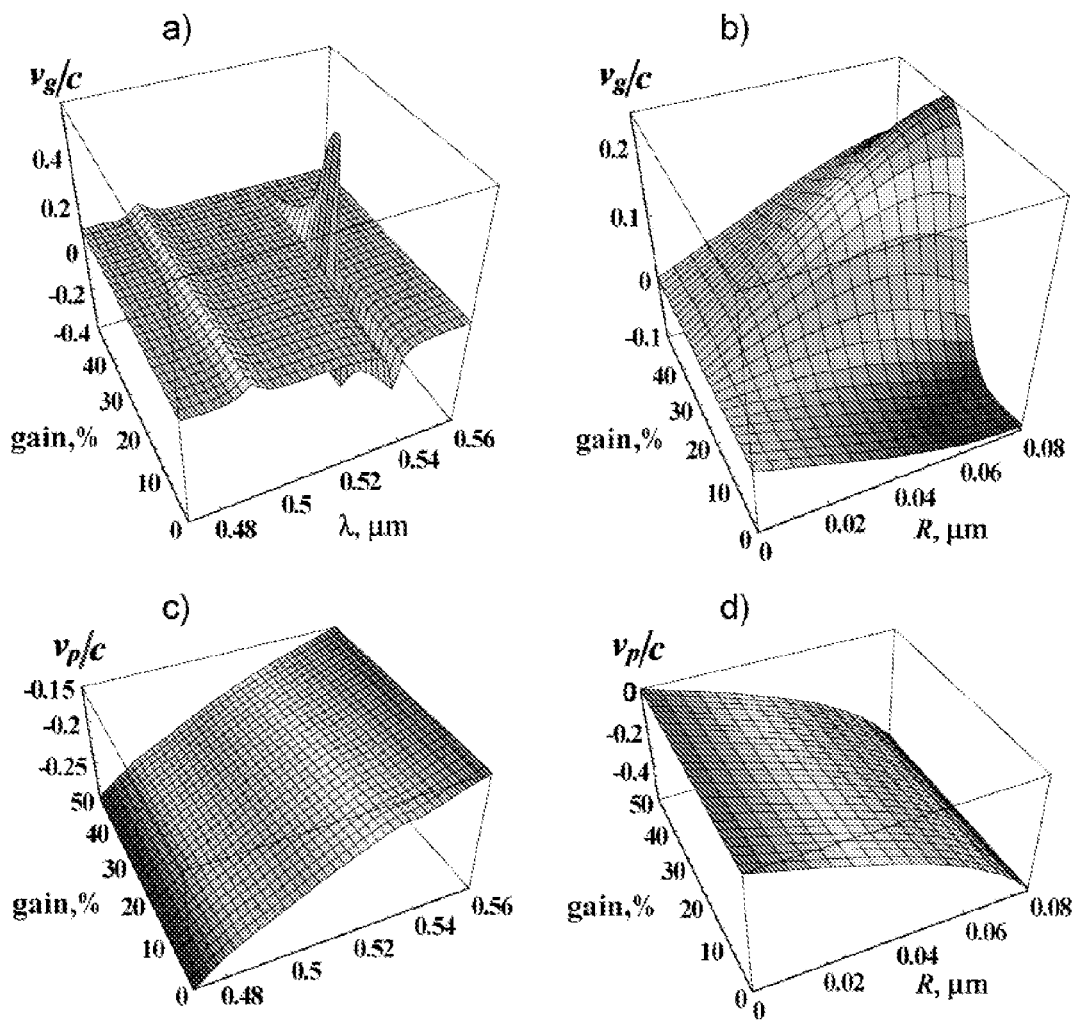
FIG. 10(a) illustrates the group velocity of the $TM_{01}$ mode in an anisotropy-based cylindrical subdiffraction waveguide, having alternating (in z direction) layers of Ag and Rh6G-doped polymer, as a function of gain and wavelength at R=35 nm.
FIG. 10(b) illustrates the phase velocity of the $TM_{01}$ mode of the system of FIG. 9(a) as functions of gain and wavelength at R=35 nm.
FIG. 10(c) illustrates the group velocity of the $TM_{01}$ mode of the system of FIG. 10(a) as functions of gain and radius at $\lambda=534$ nm.
FIG. 10(d) illustrates the phase velocity of the $TM_{01}$ mode of the system of FIG. 10(a) as functions of gain and radius at $\lambda=534$ nm.

FIG. 10 shows the behavior of the $TM_{01}$ mode in the waveguide with a metamaterial core, consisting of alternating (in z direction) layers of Ag and Rh6G-doped polymer. In the computations, Eqs. (20, 21) are used to calculate the dielectric constants of Ag and Rh6G, accompanied by the effective-medium equations $$\varepsilon_{xy} = (1-p)\varepsilon_1 + p\varepsilon_2, \quad \varepsilon_z = \frac{\varepsilon_1 \varepsilon_2}{(1-p)\varepsilon_2 + p\varepsilon_1}, \quad (24)$$

with p=50% being the metal concentration to obtain the permittivities of the nanolayer material.

Note that the phase velocity (as well as the effective refractive index) of the metamaterial photonic funnel is negative. Apart from the sign of $v_p$, the propagation of the volume mode in the metamaterial structure (FIG. 10) is similar to that of SPPs (FIG. 9). Once again, one can effectively control the group velocity between ultra-fast ($v_g<0$) and slow ($0<v_g<<c$) values in a lossy ($|k_z"/k_z|<0.08$) nanoscale system by tuning the material dispersion of the core or waveguide radius. Although the examples presented in FIGS. 9 and 10 include an anisotropic waveguide with perfectly conducting walls, the finite wall conductivity will not affect the existence of the versatile control of $v_g$, though it may lead to some quantitative corrections which can be calculated via perturbative techniques, described above.

Figure 11:
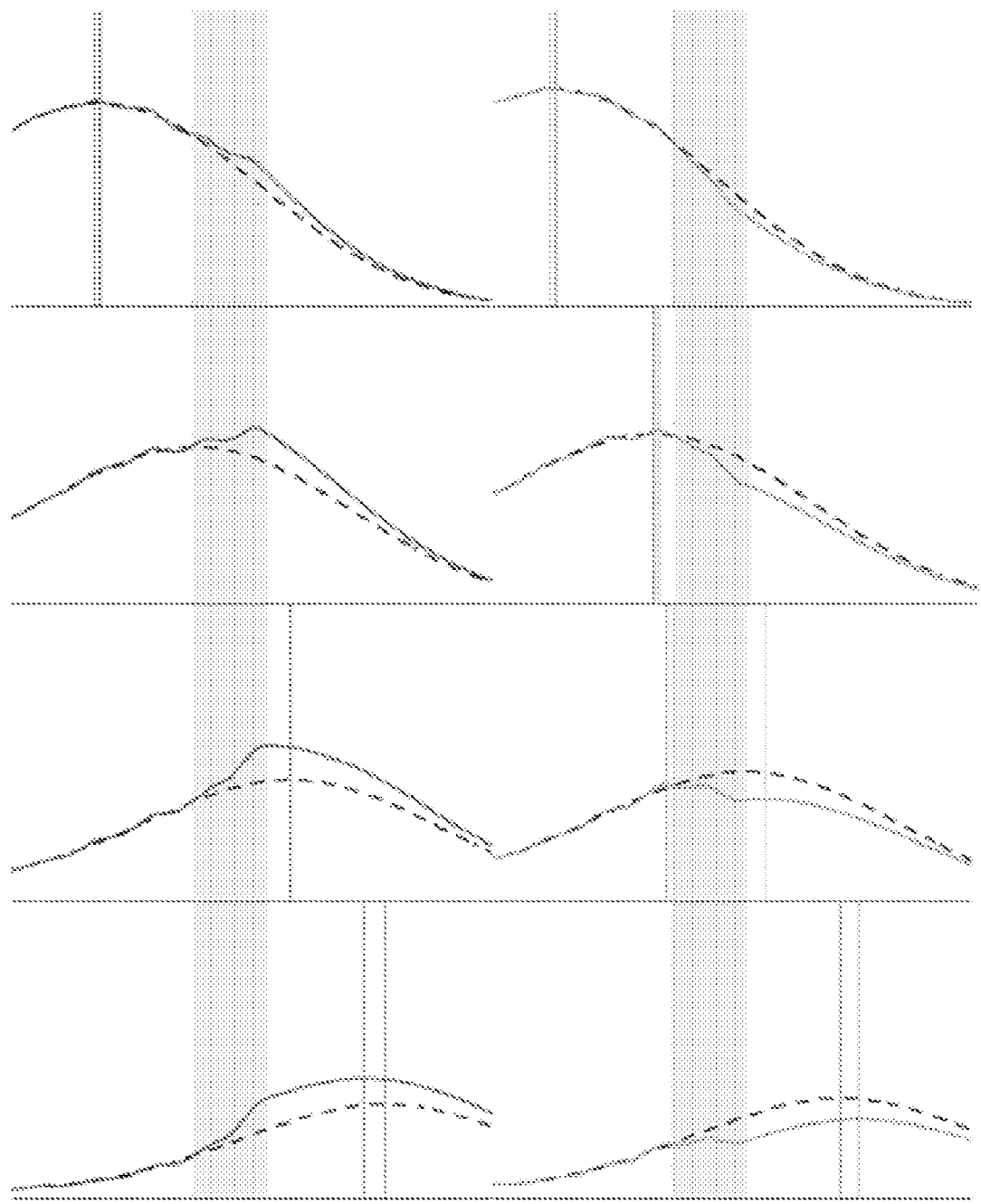
FIG. 11 illustrates the propagation of wavepackets through a tunable delay line in slow (left gain=70%) and fast (right gain=0%) regimes.

FIG. 11 further illustrates the implications of small and negative group velocities in the system, with the left four frames corresponding to the slow-light regime (gain=70%) and the right four frames corresponding to the fast-light regimes (no gain). From top to bottom, the different frames represent different time steps with a constant time interval between the frames. The solid lines correspond to the signal pulse, and the dashed line represents a reference pulse (reported for comparison). The vertical lines represent the position of pulse maxima. Note that while the maximum of fast pulse leaves the active region before the maximum of incident pulse enters active region (the shaded regions of FIG. 11), pulse propagation is completely causal and energy always flows in the positive direction.

Similar to what happens in macroscopic structures, the group velocity loses its usual meaning of velocity of energy flow in the presence of strong dispersion. The simulations of FIG. 11 indicate that regardless of the sign of the group velocity, the energy flow is always directed away from the source (in the positive z direction). Instead, the group velocity has a meaning of the velocity of the maximum of the envelope of the wavepacket. When the group velocity is positive, the maximum of the pulse leaves the medium after the maximum of the incoming pulse enter the medium. When the group velocity is negative—the maximum leaves the medium before the maximum of the incoming pulse enters the front interface of the active material. Since material properties can be manipulated by external pumping, nanoscale waveguides can be used to build all-optical tunable delay or advance lines, FIG. 11. Similar control over optical pulses can be achieved by static electric or magnetic fields via electro- or magneto-optical effects.

From the above analyses, it is seen that the performance of the PC-based waveguides is limited by the PC microstructure and by material absorption. The former introduces implicit inhomogeneity scale (PC period), where the "effective medium" approximation (Eq. (4)) breaks down. The spatial dispersion, associated with field inhomogeneities on such a scale, leads to the mode cut-off and prohibits the mode propagation when the radius of a waveguide becomes smaller than PC period. The appearance of such a cut-off is shown in FIG. 3(c). Material absorption, on the other hand, lead to energy attenuation and limit the length of passive photonic funnels to ~10λ which is acceptable for the majority of applications of these systems: near-field tips, ultra-compact detectors, wires in all-optical circuits, etc. This limitation is not applicable to waveguides with active cores. Indeed, material absorption can be substantially reduced, eliminated, or even reversed by implementing a gain medium into $\in$>0 regions of the PC. This approach is illustrated in FIG. 4(d) by introducing gain into AlInAs part of the far-IR structure, which can be realized via quantum cascade technology.

In addition, the operating frequency of the photonic funnels described herein can be changed from optical, to near-IR, to far-IR, to THz domain by varying the PC composition and periodicity. The PC-based waveguides may be used in ultra-compact all-optical and electro-optical devices, near-field microscopy, and other applications requiring effective sub-diffraction and cross-scale energy transfer, as well as in a variety of nonlinear optical applications in positive- and negative-index materials since the energy compression and corresponding enhancement of local field will result in the strong enhancement of nonlinear field moments.

In view of the foregoing, the present invention promotes efficient transfer of electromagnetic energy to and from sub-wavelength scale and can be used to build high-performance near-field microscope tips, subwavelength probes, single molecule detectors, and achieve miniaturization of terahertz sources and increase nonlinearities. Left- and right-handed designs allow effective phase manipulation at subwavelength scale. Since the mode structure of the funnels is identical to that of conventional waveguides (e.g., optical fibers), the design easily integrates with modern technologies. Applications of the present invention include second- and higher-harmonic generation on the nanoscale, low-loss direct coupling to ultra-compact all-optical circuits, near-field optical microscopes with positive or negative refraction with efficiency several orders of magnitude better than current state of the art, sensors with subwavelength resolution (e.g., near-field probes, single molecule detectors, miniaturization of energy sources), low-loss all-optical couplers between optical transistors/processors/circuits and long-range optical fibers, signal amplification, phase advance in positive-index materials, phase retardation in negative-index materials, ultra-slow and superluminal pulse propagation.

These and other advantages of the present invention will be apparent to those skilled in the art from the foregoing specification. Accordingly, it will be recognized by those skilled in the art that changes or modifications may be made to the above-described embodiments without departing from the broad inventive concepts of the present invention. It should therefore be understood that this invention is not limited to the particular embodiments described herein, but is intended to include all changes and modifications that are within the scope and spirit of the present invention as set forth in the claims.

What is claimed is:

1. An apparatus for propagating electromagnetic radiation of a selected vacuum wavelength, comprising a waveguide core and a cladding disposed about the core, the waveguide core including a material with an anisotropic dielectric permittivity, with the optical axis of the material primarily aligned with the direction of light propagation, and with the core having a cross-sectional dimension smaller than about ½ of the selected wavelength at least at one portion of the waveguide core, wherein the waveguide core comprises a plurality of material layers oriented perpendicular to a longitudinal axis of the waveguide core, the layers having a thickness along the direction of the longitudinal axis smaller than the selected vacuum wavelength divided by the absolute value of the effective refractive index.

2. The apparatus according to claim 1, wherein the cross-sectional dimension of the waveguide core decreases along the length of the waveguide core creating a taper to provide a photonic funnel.

3. The apparatus according to claim 2, wherein at least one portion of the taper has a minimum cross-sectional dimension of less than about ½ the selected vacuum wavelength.

4. The apparatus according to claim 1 or 2, wherein the waveguide core comprises a photonic crystal.

5. The apparatus according to claim 1, wherein the plurality of layers comprises alternating layers of a positive dielectric permittivity and a negative dielectric permittivity.

6. The apparatus according to claim 1, wherein the plurality of material layers comprises alternating layers of Si and Ag, alternating layers of Si and SiC, or alternating layers of InGaAs and AlInAs.

7. The apparatus according to claim 1, wherein the plurality of layers comprises layers of two alternating materials.

8. The apparatus according to claim 1 or 2, wherein the cladding comprises a metal.

9. The apparatus according to claim 1 or 2, wherein the cladding comprises a dielectric.

10. The apparatus according to claim 1 or 2, wherein the waveguide core comprises a nonmagnetic, nonresonant material.

11. The apparatus according to claim 1 or 2, wherein the waveguide core comprises at least one gain region to provide amplification of the electromagnetic radiation.

12. A photonic funnel for compressing electromagnetic radiation of a selected wavelength, comprising a waveguide core that includes a plurality of material layers oriented perpendicular to the longitudinal axis of the photonic funnel, the material layers selected to provide an anisotropic dielectric permittivity with optical axis directed along the longitudinal axis, and the waveguide core having a cross-sectional dimension that decreases along the length of the longitudinal axis to provide a taper, and the layers having a thickness along the direction of the longitudinal axis smaller than the selected vacuum wavelength divided by the absolute value of the effective refractive index, and wherein at least one portion of the taper has a minimum cross-sectional dimension of less than about ½ the selected vacuum wavelength.

13. The apparatus according to claim 12, wherein the waveguide core comprises a photonic crystal.

14. The apparatus according to claim 12, wherein the plurality of layers comprises alternating layers of a positive dielectric permittivity and a negative dielectric permittivity.

15. The apparatus according to claim 12, wherein the plurality of material layers comprises alternating layers of Si and Ag, alternating layers of Si and SiC, or alternating layers of InGaAs and AlInAs.

16. The apparatus according to claim 12, wherein the plurality of layers comprises layers of two alternating materials.

17. The apparatus according to claim 12, comprising a metal cladding.

18. The apparatus according to claim 12, comprising a dielectric cladding.

19. The apparatus according to claim 12, wherein the waveguide core comprises a nonmagnetic, nonresonant material.

20. The apparatus according to claim 12, wherein the waveguide core comprises at least one gain region to provide amplification of the electromagnetic radiation.

21. The apparatus according to claim 1, wherein the waveguide core comprises a plurality of nanowire arrays, nanoparticle arrays, or combinations thereof.

22. The apparatus according to claim 1 or 12, wherein the dielectric permittivity comprises a component parallel to the optical axis and a component perpendicular to the optical axis with the parallel and perpendicular components having opposite signs.

23. The apparatus according to claim 1 or 12, comprising a pump configured to modulate the material gain, whereby the group velocity within the waveguide core may be controlled.

* * * * *